United States Patent
Jiang et al.

(10) Patent No.: US 9,890,318 B1
(45) Date of Patent: Feb. 13, 2018

(54) DRILLING FLUID ADDITIVE COMPOSITION AND WATER-BASED DRILLING FLUID SUITABLE FOR HIGH-PRESSURE PLUGGING

(71) Applicant: China University of Petroleum (Beijing), Changping District, Beijing (CN)

(72) Inventors: Guancheng Jiang, Beijing (CN); Chong Liu, Beijing (CN); Yinbo He, Beijing (CN); Qingying Ge, Beijing (CN); Lili Yang, Beijing (CN); Yong Wang, Shenyang (CN); Fan Liu, Beijing (CN); Yongqing Zhang, Beijing (CN); Zhaohui Wang, Beijing (CN); Jingdong Hu, Beijing (CN); Lin Cheng, Beijing (CN); Guangchang Ma, Beijing (CN); Yong Qin, Beijing (CN); Chunyao Peng, Beijing (CN); Haifang Sun, Beijing (CN); Deli Gao, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 15/636,014

(22) Filed: Jun. 28, 2017

(30) Foreign Application Priority Data

Nov. 16, 2016 (CN) .......................... 2016 1 1007024

(51) Int. Cl.
C09K 8/44 (2006.01)
C09K 8/42 (2006.01)
C09K 8/08 (2006.01)
C09K 8/12 (2006.01)

(52) U.S. Cl.
CPC ................. *C09K 8/12* (2013.01); *C09K 8/08* (2013.01); *C09K 8/426* (2013.01); *C09K 8/44* (2013.01); *C09K 2208/10* (2013.01)

(58) Field of Classification Search
None
See application file for complete search history.

(56) References Cited

U.S. PATENT DOCUMENTS

| 5,607,905 A * | 3/1997 | Dobson, Jr. | C09K 8/08 166/300 |
| 2009/0008095 A1* | 1/2009 | Duncum | C09K 8/032 166/292 |
| 2012/0277124 A1* | 11/2012 | Zhang | C09K 8/032 507/117 |

* cited by examiner

*Primary Examiner* — John J Figueroa
(74) *Attorney, Agent, or Firm* — Calfee Halter & Griswold LLP

(57) ABSTRACT

The present invention relates to the well drilling field in petroleum industry, in particular to a drilling fluid additive composition and a water-based drilling fluid suitable for high pressure plugging while drilling. The composition contains a bridging agent, a nano-plugging agent, a rheological modifier, a bionic wall bracing agent, and a bionic shale inhibitor, wherein, the bridging agent is a weak-crosslinked copolymer, in which the content of cross-linker structures is 0.1-1 wt. %; the nano-plugging agent is modified nanometer silicon dioxide particles; the rheological modifier is a dimer acid-organic amine copolymer; and the bionic wall bracing agent is carboxymethyl chitosan with a dopamine-derived base group grafted on its main chain. With a synergistic effect among the bridging agent, the nano-plugging agent, the rheological modifier, the bionic wall bracing agent, and the bionic shale inhibitor in the composition provided in the present invention, the water-based drilling fluid containing the composition as additive can attains an excellent plugging effect in a drilling process.

20 Claims, 1 Drawing Sheet

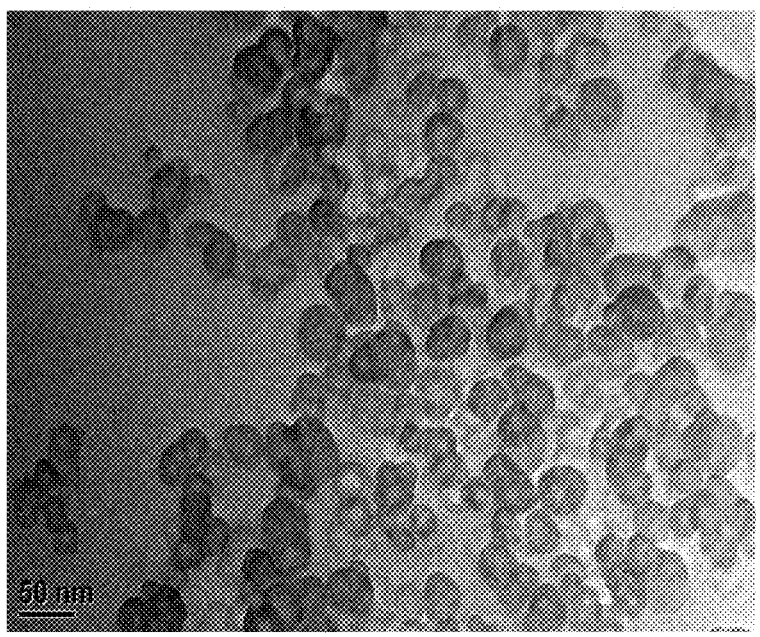

DRILLING FLUID ADDITIVE COMPOSITION AND WATER-BASED DRILLING FLUID SUITABLE FOR HIGH-PRESSURE PLUGGING

CROSS REFERENCE TO RELATED APPLICATIONS

This application claims priority to Chinese Application No. 201611007024.5, filed on Nov. 16, 2016, entitled "Drilling Fluid Additive Composition and Water-Based Drilling Fluid Suitable for High-Pressure Plugging", which is specifically and entirely incorporated by reference.

FIELD OF THE INVENTION

The present invention relates to the well drilling field in petroleum industry, in particular to a drilling fluid additive composition, a use of the drilling fluid additive composition, a water-based drilling fluid suitable for high pressure plugging while drilling, and use of the water-based drilling fluid.

BACKGROUND OF THE INVENTION

Lost circulation in drilling engineering is a phenomenon that the drilling fluid leaks from the well bore into the formation. Lost circulation often happens in the drilling or trip process, and is a challenge frequently encountered in the oil and gas exploration and drilling process. At present, commonly used plugging methods include bridge plugging and cement plugging. Cement plugging is to plug the fractures and solution cavities in the leak formation, but it is difficult to control the initial setting time and final setting time, the construction risk is high, and problems such as quick leakage of high-density cement slurry or quick setting of quick-setting cement may occur easily, resulting in downhole accidents such as jamming of drilling tools and causing severe economic loss. Bridge plugging is mainly to prepare plugging slurry from plugging materials at a certain ratio, and plug the fractures and pore channels with the plugging slurry, so that the leak formation is sealed under bridging, bracing, bonding, plugging, and filling effects. A key technique for bridge plugging lies in whether the distribution of particle size of the bridging agent matches the diameters of the leak channels. However, in the drilling process, sometimes the formulation of the bridging agent can't be selected and determined because the widths of fractures and the sizes of the pores in the leak formation can't be ascertained; consequently, the uncertainty of successful operation is increased, the success ratio of plugging is compromised, and the resultant plugged formation doesn't have high strength and may leak again owing to the high differential pressure in the well drilling process.

SUMMARY OF THE INVENTION

To overcome the drawback of poor plugging effect of the existing lost circulation materials for well drilling in the prior art, the present invention provides a drilling fluid additive composition that supports plugging while drilling and can attain a good plugging effect and a water-based drilling fluid suitable for high-pressure plugging while drilling.

To attain the object described above, the present invention provides a drilling fluid additive composition, containing a bridging agent, a nano-plugging agent, a rheological modifier, a bionic wall bracing agent, and a bionic shale inhibitor, wherein, the bridging agent is a weak-crosslinked copolymer that contains structural units represented by formula (1), structural units represented by formula (2), and structural units represented by formula (3), and content of cross-linker structures in the weak-crosslinked copolymer is 0.1-1 wt. %;

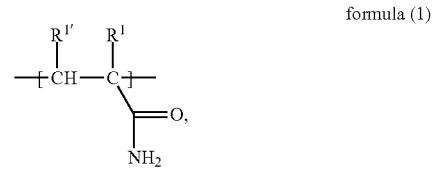

formula (1)

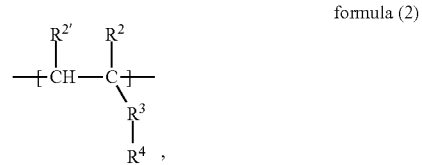

formula (2)

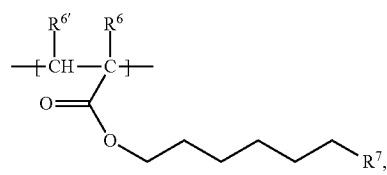

formula (3)

Where, $R^1$, $R^{1'}$, $R^2$, $R^{2'}$, $R^6$ and $R^{6'}$ are independently selected from H and C1-C6 alkyl; $R^3$ is selected from C0-C6 alkylene; $R^4$ is selected from —COOM, —SO$_3$M or —CO—NH—$R^5$—SO$_3$M, $R^5$ is selected from C0-C6 alkylene, M is selected from H or alkali metal element; $R^7$ is selected from H or C1-C20 alkyl; the cross-linker structures in the weak-crosslinked copolymer are provided by one or more of cross-linkers represented by the following formula (4):

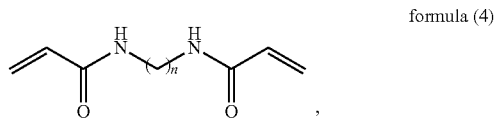

formula (4)

n is selected from integers within a range of 1-6;

The nano-plugging agent is a modified silicon dioxide nano-particle, modifying group on the modified silicon dioxide nano-particle includes an acrylic copolymer chain, and structural units in the acrylic copolymer chain are provided by one or more of monomers represented by the following formula (A) and one or more of monomers represented by the following formula (B); the molar ratio of the structural units provided by the monomers represented by formula (A) to the structural units provided by the monomers represented by formula (B) is 1:0.5-5; the weight-average molecular weight of the acrylic copolymer chain is 100,000-1,500,000 g/mol:

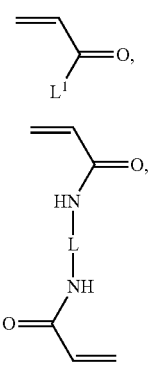

formula (A)

formula (B)

wherein $L^1$ is selected from —OH, C1-C10 alkoxy, or —N($L^3$)$L^2$, $L^2$ and $L^3$ are independently selected from H, C1-C10 alkyl, and C1-C10 alkyl substituted by substituent, and the substituent is one or more of —COOH, —OH, halogen, and —SO$_3$H; L is C0-C10 alkylene;

the rheological modifier is a dimer acid-organic amine copolymer comprising structural units from dimer acid, structural units from alkylamine and structural units from arylamine, of which the dimer acid is a dimer of oleic acid and linoleic acid, the alkylamine is one or more of C10-C20 alkyl primary amines, and the arylamine is one or more of aniline and aniline substituted by C1-C3 alkyl at one or more sites on benzene ring;

the bionic wall bracing agent is carboxymethyl chitosan with a dopamine-derived group represented by the following formula (I-1) grafted on its main chain:

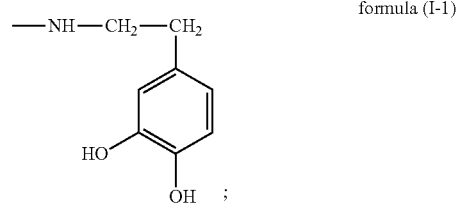

formula (I-1)

the bionic shale inhibitor is composed of structural units represented by the following formula (III-1) and structural units represented by the following formula (IV-1):

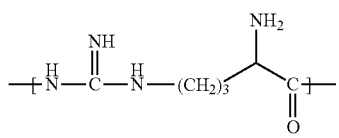

formula (III-1)

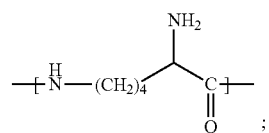

formula (IV-1)

the molar ratio of the structural units represented by formula (III-1) to the structural units represented by formula (IV-1) is 0.2-6:1, and the weight-average molecular weight of the bionic shale inhibitor is 800-4,000 g/mol.

With a synergistic effect among the bridging agent, nano-plugging agent, rheological modifier, bionic wall bracing agent, and bionic shale inhibitor in the composition provided in the present invention, a water-based drilling fluid that contains the composition as an additive can attains an excellent plugging effect in a drilling process. In addition, the water-based drilling fluid has an advantage of plugging while drilling without stop, and thereby saves drilling time and reduces drilling cost. More importantly, such a drilling fluid has high pressure bearing capability, and can achieve successful one-off plugging. The drilling fluid not only attains plugging, anti-collapse, and wall bracing effects, but also improves surface smoothness and densify of the mud cakes, and has a rheological property that doesn't vary much after the composition is added.

Other features and advantages of the present invention will be further detailed in the embodiments hereunder.

BRIEF DESCRIPTION OF DRAWINGS

FIG. 1 is a SEM image of the modified nanometer silicon dioxide particles obtained in an preparation example 1 of the nano-plugging agent.

DETAILED DESCRIPTION OF THE EMBODIMENTS

Hereunder some embodiments of the present invention will be detailed. It should be appreciated that the embodiments described here are only provided to describe and explain the present invention, but shall not be deemed as constituting any limitation to the present invention.

The ends points and any value in the ranges disclosed in the present invention are not limited to the exact ranges or values. Instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

The present invention provides a drilling fluid additive composition, containing a bridging agent, a nano-plugging agent, a rheological modifier, a bionic wall bracing agent, and a bionic shale inhibitor, wherein, the bridging agent is a weak-crosslinked copolymer that contains structural units represented by formula (1), structural units represented by formula (2), and structural units represented by formula (3), and content of cross-linker structures in the weak-crosslinked copolymer is 0.1-1 wt. %;

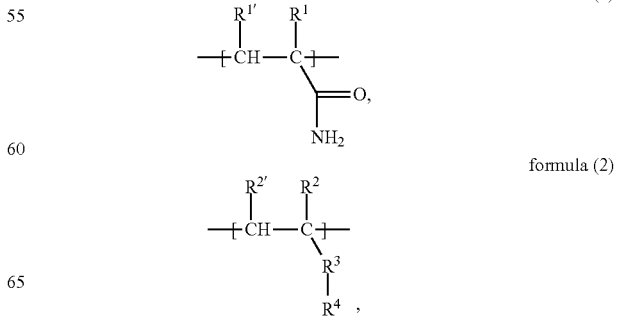

formula (1)

formula (2)

-continued

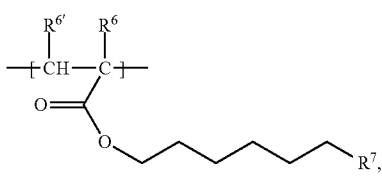

formula (3)

Where, $R^1$, $R^{1'}$, $R^2$, $R^{2'}$, $R^6$ and $R^{6'}$ are independently selected from H and C1-C6 alkyl; $R^3$ is selected from C0-C6 alkylene; $R^4$ is selected from —COOM, —SO$_3$M or —CO—NH—$R^5$—SO$_3$M, $R^5$ is selected from C0-C6 alkylene, M is selected from H or alkali metal element; $R^7$ is selected from H or C1-C20 alkyl; the cross-linker structures in the weak-crosslinked copolymer are provided by one or more of cross-linkers represented by the following formula (4):

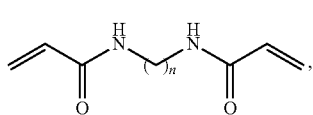

formula (4)

n is selected from integers within a range of 1-6;

The nano-plugging agent is a modified silicon dioxide nano-particle, modifying group on the modified silicon dioxide nano-particle includes an acrylic copolymer chain, and structural units in the acrylic copolymer chain are provided by one or more of monomers represented by the following formula (A) and one or more of monomers represented by the following formula (B); the molar ratio of the structural units provided by the monomers represented by formula (A) to the structural units provided by the monomers represented by formula (B) is 1:0.5-5; the weight-average molecular weight of the acrylic copolymer chain is 100,000-1,500,000 g/mol:

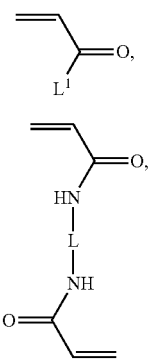

formula (A)

formula (B)

wherein $L^1$ is selected from —OH, C1-C10 alkoxy, or —N($L^3$)$L^2$, $L^2$ and $L^3$ are independently selected from H, C1-C10 alkyl, and C1-C10 alkyl substituted by substituent, and the substituent is one or more of —COOH, —OH, halogen, and —SO$_3$H; L is C0-C10 alkylene;

the rheological modifier is a dimer acid-organic amine copolymer comprising structural units from dimer acid, structural units from alkylamine and structural units from arylamine, of which the dimer acid is a dimer of oleic acid and linoleic acid, the alkylamine is one or more of C10-C20 alkyl primary amines, and the arylamine is one or more of aniline and aniline substituted by C1-C3 alkyl at one or more sites on benzene ring;

the bionic wall bracing agent is carboxymethyl chitosan with a dopamine-derived group represented by the following formula (I-1) grafted on its main chain:

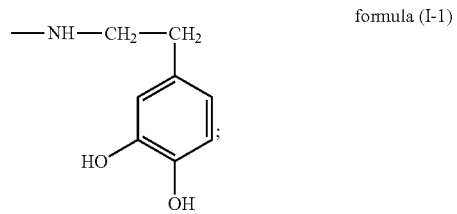

formula (I-1)

the bionic shale inhibitor is composed of structural units represented by the following formula (III-1) and structural units represented by the following formula (IV-1):

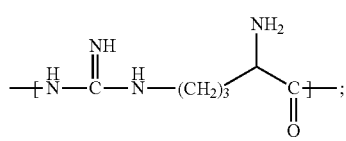

formula (III-1)

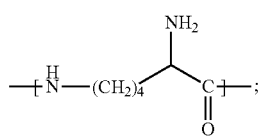

formula (IV-1)

the molar ratio of the structural units represented by formula (III-1) to the structural units represented by formula (IV-1) is 0.2-6:1, and the weight-average molecular weight of the bionic shale inhibitor is 800-4,000 g/mol.

According to the present invention, the bridging agent, the nano-plugging agent, the rheological modifier, the bionic wall bracing agent, and the bionic shale inhibitor can be used at a ratio within a wide range, and enable the resultant drilling fluid to receive a good effect of plugging while drilling and high pressure bearing capability; moreover, in order to give a better play to the synergistic effect among the bridging agent, the nano-plugging agent, the rheological modifier, the bionic wall bracing agent and the bionic shale inhibitor, preferably the weight ratio of the bridging agent to the nano-plugging agent to the rheological modifier to the bionic wall bracing agent to the bionic shale inhibitor is 100:40-200:5-80:20-200:10-80, more preferably is 100:50-150:10-60:30-120:20-70, even more preferably is 100:60-140:12-50:40-100:25-70. Particularly preferably, the additive composition provided in the present invention is a combination of the bridging agent, the nano-plugging agent, the rheological modifier, the bionic wall bracing agent and the bionic shale inhibitor.

According to the present invention, the weak-crosslinked copolymer is a cross-linked copolymer with 0.1-1 wt. % content of cross-linker structures; under such cross-linked level, and during a well drilling process, the structural units represented by formula (1), structural units represented by formula (2), and structural units represented by formula (3) in the copolymer would enter into the fractures in the well wall and absorb water, the structural units represented by formula (1) and structural units represented by formula (2)

regulate the size of the particles of the weak-crosslinked copolymer by hydrated swelling, and the structural units represented by formula (3) form dynamic bridging structures among the particles of the polymer under a hydrophobic association effect, so that the size of particles of the weak-crosslinked copolymer formed in the water-based drilling fluid and the structures among the particles are regulated, and thereby well match the sizes of formation fractures or pores; in addition, working with the nano-plugging agent, the rheological modifier, the bionic wall bracing agent and the bionic shale inhibitor, the obtained drilling fluid additive composition can achieve plugging, anti-collapse and wall bracing effects and improve surface smoothness and density of the mud cakes even in a high-pressure environment, and thereby realizes one-off plugging and prevention the occurrence of lost circulation.

According to the present invention, wherein, the C1-C6 alkyl may be methyl, ethyl, n-propyl, isopropyl, n-butyl, isobutyl, sec-butyl, tert-butyl, n-pentyl, isopentyl, n-hexyl, etc., for example.

For example, the C0-C6 alkylene may be C0 alkylene or alkylene formed by the above-mentioned C1-C6 alkyl, wherein, the C0 alkylene may be deemed as a linking bond or absent simply, i.e., the groups at the two ends of that group are directly linked.

For example, the C1-C20 alkyl may be methyl, ethyl, n-propyl, isopropyl, n-butyl, isobutyl, sec-butyl, tert-butyl, n-pentyl, isopentyl, n-hexyl, n-heptyl, n-octyl, n-nonyl, n-decyl, n-hendecyl, n-dodecyl, n-tridecyl, n-tetradecyl, n-pentadecyl, n-hexadecyl, n-heptadecyl, n-octodecyl, n-nonadecyl, or n-eicosyl, etc.

To give a better play to the role of the copolymer as a bridging agent, preferably, in the weak-crosslinked copolymer, $R^1$, $R^{1'}$, $R^2$, $R^{2'}$ $R^6$ and $R^{6'}$ are independently selected from H and C1-C4 alkyl; $R^3$ is selected from C0-C4 alkylene; $R^4$ is selected from —COOM, —SO$_3$M or —CO—NH—$R^5$—SO$_3$M, $R^5$ is selected from C1-C6 alkylene, M is selected from H, Na or K; $R^7$ is selected from C2-C16 alkyl.

More preferably, $R^1$, $R^{1'}$, $R^2$, $R^{2'}$, $R^6$ and $R^{6'}$ are independently selected from H, methyl, ethyl, and n-propyl; $R^3$ is selected from C0 alkylene, —CH$_2$—, —CH$_2$—CH$_2$—, —CH$_2$—CH$_2$—CH$_2$—, —CH(CH$_3$)—CH$_2$—, —CH$_2$—CH(CH$_3$)— or —CH$_2$—(CH$_2$)$_2$—CH$_2$—; $R^4$ is selected from —COOH, —SO$_3$M or —CO—NH—$R^5$—SO$_3$M, $R^5$ is selected from —CH$_2$—, —CH$_2$—CH$_2$—, —CH$_2$—CH$_2$—CH$_2$—, —CH(CH$_3$)—CH$_2$—, —CH$_2$—CH(CH$_3$)—, —CH$_2$—(CH$_2$)$_2$—CH$_2$—, —CH$_2$—CH(CH$_3$)—CH$_2$—, —C(CH$_3$)$_2$—CH$_2$— or —CH$_2$—C(CH$_3$)$_2$—, M is selected from H, Na or K; $R^7$ is selected from ethyl, n-propyl, n-butyl, n-pentyl, n-hexyl, n-heptyl, n-octyl, n-nonyl, n-decyl, n-hendecyl, n-dodecyl, n-tridecyl, n-tetradecyl, n-pentadecyl or n-hexadecyl.

According to the present invention, preferably the weight-average molecular weight of the weak-crosslinked copolymer is 3×10$^6$-10×10$^6$ g/mol, more preferably is 3.5×10$^6$-7×10$^6$ g/mol, even more preferably is 4×10$^6$-5.5×10$^6$ g/mol. If the weight-average molecular weight of the weak-crosslinked copolymer is within the above-mentioned ranges, the weak-crosslinked copolymer can serve as a bridging agent better, and has a better temperature resistance property, i.e., it can spontaneously match the fractures in the well wall and thereby accomplish plugging in a hotter formation environment. The molecular weight distribution coefficient of the weak-crosslinked copolymer may be 2-4, for example.

According to the present invention, the ratio of the structural units represented by formula (1) to the structural units represented by formula (2) to the structural units represented by formula (3) in the weak-crosslinked copolymer may vary within a wide range; however, for the purpose of optimizing the tackifying property, salinity resistance property, and temperature resistance property of the resultant weak-crosslinked copolymer, preferably the molar ratio of the structural units represented by formula (1) to the structural units represented by formula (2) to the structural units represented by formula (3) is 10-50:3-20:1, more preferably is 12-40:5-15:1, even more preferably is 12-30:5-10:1.

According to the present invention, to obtain a bridging agent that can spontaneously match the fractures in the formation, preferably the content of cross-linker structures in the weak-crosslinked copolymer is 0.3-0.6 wt. %, more preferably is 0.35-0.45 wt. %. It should be understood that the copolymer in the present invention is a cross-linked copolymer, which shall have cross-linkers that provide cross-link bonds. Though there is no particular restriction in the present invention, a cross-linker is used in the present invention to form cross-link bonds and thereby form cross-linkers (may be understood as structures formed by the cross-linker) in the weak-crosslinked copolymer. Preferably, the cross-linker structures in the weak-crosslinked copolymer are provide by one or more of cross-linker represented by the following formula (4):

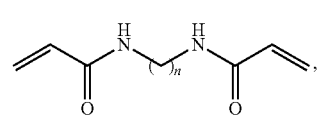

Formula (4)

n is selected from integers within a range of 1-6.

Example of the cross-linker represented by formula (4) may include:

formula (4-1): n is 1 (also referred to as N,N-methylene-bis acrylamide);

formula (4-2): n is 2 (also referred to as N,N-ethylidene-bis acrylamide);

formula (4-3): n is 3 (also referred to as N,N-propylidene-bis acrylamide).

In such a case, it is deemed that the content of the cross-linker structures in the weak-crosslinked copolymer is the weight percentage of the structures provided by the cross-linker in the weak-crosslinked copolymer, wherein, under the condition of the above-mentioned content of the cross-linker structures, in the weak-crosslinked copolymer, the swelling ratio of the weak-crosslinked copolymer measured with a laser particle size analyzer preferably is 30-50, more preferably is 35-45.

According to the present invention, the weak-crosslinked copolymer may be prepared with any conventional method in the art; however, preferably, the method for preparing the weak-crosslinked copolymer comprises: subjecting a compound represented by formula (1'), a compound represented by formula (2'), and a compound represented by formula (3') to have emulsion polymerization in an aqueous solution in the presence of a redox initiation system, a cross-linker and an emulsifier, wherein, the cross-linker is used in an amount that ensures the content of the cross-linker structures in the resultant weak-crosslinked copolymer is 0.1-1 wt. %,

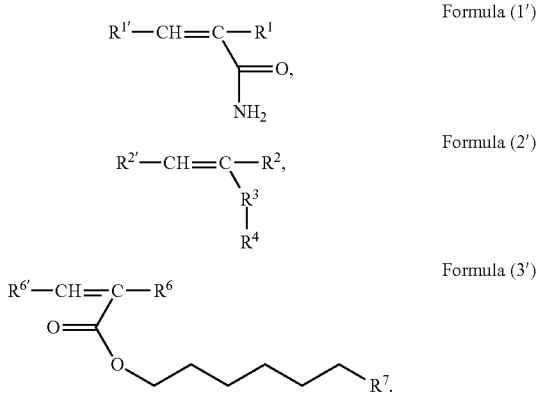

Formula (1')
Formula (2')
Formula (3')

Wherein, the substituents involved in the monomers in the above-mentioned method are those described above, and will not be detailed anymore here. Alternatively, the compound represented by formula (1'), compound represented by formula (2'), and compound represented by formula (3') may be selected properly according to the specific structural units of the copolymer described above.

Wherein, the examples of the compound represented by formula (1') may be one or more of compounds represented by the following formula:

formula (1'-1): $R^1$ and $R^{1'}$ are H (also referred to as acrylamide);
formula (1'-2): $R^1$ is methyl, and $R^{1'}$ is H (also referred to as methacrylamide);
formula (1'-3): $R^1$ is ethyl, and $R^{1'}$ is H (also referred to as ethyl acrylamide);
formula (1'-4): $R^1$ is H, and $R^{1'}$ is methyl (also referred to as 2-butenylamide).

Wherein, the examples of the compound represented by formula (2') may be one or more of compounds represented by the following formula:

formula (2'-1): $R^2$ and $R^{2'}$ are H, $R^3$ is C0 alkylene, and $R^4$ is selected from —COOH (also referred to as acrylic acid);
formula (2'-2): $R^2$ is methyl, $R^{2'}$ is H, $R^3$ is C0 alkylene, and $R^4$ is selected from —COOH (also referred to as methacrylic acid);
formula (2'-3): $R^2$ and $R^{2'}$ are H, $R^3$ is —$CH_2$—, and $R^4$ is selected from —$SO_3H$ (also referred to as propanesulfonic acid);
formula (2'-4): $R^2$ is methyl, $R^{2'}$ is H, $R^3$ is —$CH_2$—, and $R^4$ is selected from —$SO_3H$ (also referred to as methyl propanesulfonic acid);
formula (2'-5): $R^2$ and $R^{2'}$ are H, $R^3$ is C0 alkylene, and $R^4$ is selected from —CO—NH—$C(CH_3)_2$—$CH_2$—$SO_3M$ (also referred to as 2-acrylamide-2-methyl propanesulfonic acid).

Wherein, the examples of the compound represented by formula (3') may be one or more of compounds represented by the following formula:

formula (3'-1): $R^6$ is methyl, $R^{6'}$ is H, and $R^7$ is selected from n-butyl (also referred to as decyl methacrylate);
formula (3'-2): $R^6$ and $R^{6'}$ are H, and $R^7$ is selected from n-butyl (also referred to as decyl acrylate); formula (3'-3): $R^6$ is methyl, $R^{6'}$ is H, and $R^7$ is selected from n-pentyl (also referred to as hendecyl methacrylate);
formula (3'-4): $R^6$ and $R^{6'}$ are H, and $R^7$ is selected from n-pentyl (also referred to as hendecyl acrylate);
formula (3'-5): $R^6$ is methyl, $R^{6'}$ is H, and $R^7$ is selected from n-hexyl (also referred to as dodecyl methacrylate);
formula (3'-6): $R^6$ and $R^{6'}$ are H, and $R^7$ is selected from n-hexyl (also referred to as dodecyl acrylate);
formula (3'-7): $R^6$ is methyl, $R^{6'}$ is H, and $R^7$ is selected from n-heptyl (also referred to as tridecyl methacrylate);
formula (3'-8): $R^6$ and $R^{6'}$ are H, and $R^7$ is selected from n-heptyl (also referred to as tridecyl acrylate);
formula (3'-9): $R^6$ is methyl, $R^{6'}$ is H, and $R^7$ is selected from n-octyl (also referred to as tetradecyl methacrylate);
formula (3'-10): $R^6$ and $R^{6'}$ are H, and $R^7$ is selected from n-octyl (also referred to as tetradecyl acrylate);
formula (3'-11): $R^6$ is methyl, $R^{6'}$ is H, and $R^7$ is selected from n-nonyl (also referred to as pentadecyl methacrylate);
formula (3'-12): $R^6$ and $R^{6'}$ are H, and $R^7$ is selected from n-nonyl (also referred to as pentadecyl acrylate);
formula (3'-13): $R^6$ is methyl, $R^{6'}$ is H, and $R^7$ is selected from n-decyl (also referred to as hexadecyl methacrylate);
formula (3'-14): $R^6$ and $R^{6'}$ are H, and $R^7$ is selected from n-decyl (also referred to as hexadecyl acrylate);
formula (3'-15): $R^6$ is methyl, $R^{6'}$ is H, and $R^7$ is selected from n-hendecyl (also referred to as heptadecyl methacrylate);
formula (3'-16): $R^6$ and $R^{6'}$ are H, and $R^7$ is selected from n-hendecyl (also referred to as heptadecyl acrylate);
formula (3'-17): $R^6$ is methyl, $R^{6'}$ is H, and $R^7$ is selected from n-dodecyl (also referred to as octodecyl methacrylate);
formula (3'-18): $R^6$ and $R^{6'}$ are H, and $R^7$ is selected from n-dodecyl (also referred to as octodecyl acrylate).

According to the present invention, in the method for preparing the weak-crosslinked copolymer, the amount of the monomer may be selected according to the proportions and molecular weights of the structural units of the required copolymer. Preferably, the molar ratio of the compound represented by formula (1') to the compound represented by formula (2') to the compound represented by formula (3') is 10-50:3-20:1, more preferably is 12-40:5-15:1, even more preferably is 12-30:5-10:1. To facilitate the emulsion polymerization and reasonably control the molecular weight of the resultant copolymer, preferably, based on 100 g of the aqueous solution, the total mole content of the compound represented by formula (1'), compound represented by formula (2') and compound represented by formula (3') is 0.1-5 mol, more preferably is 0.2-2 mol, even more preferably is 0.5-1 mol, wherein, the aqueous solution may be single water or a mixture of water with some solvents that doesn't have influence on the reactions in the present invention (e.g., one or more of methanol, ethanol, ethylene glycol, propanol, and isopropanol, etc.); of course, preferably the aqueous solution is water.

According to the present invention, in the method for preparing the weak-crosslinked copolymer, the cross-linker may be introduced in a way that the compound represented by formula (1'), compound represented by formula (2') and compound represented by formula (3') are cross-linked to a certain degree in the emulsion polymerization process, and the cross-linker is used in an amount that ensure the content of the cross-linker structures in the resultant weak-crosslinked copolymer is 0.1-1 wt. %, and thereby the weak-crosslinked structures required in the present invention are formed; preferably, the cross-linker is used in an amount that ensure the content of the cross-linker structures in the resultant weak-crosslinked copolymer is 0.3-0.6 wt. %, more preferably is 0.35-0.45 wt. %. Under that condition, preferably, based on the total weight of the compound represented by formula (1'), compound represented by formula (2') and compound represented by formula (3'), for example, the amount of the cross-linker is 0.1-1 wt. %, more preferably is 0.3-0.6 wt. %, and even more preferably is 0.35-0.45 wt.

%. The selection of the cross-linker has been described above, and will not be further detailed here.

According to the present invention, in the method for preparing the weak-crosslinked copolymer, the redox initiation system may be any conventional redox initiation system in the art, as long as it can initiate polymerization and thereby the weak-crosslinked copolymer in the present invention can be obtained; preferably, the oxidizer in the redox initiation system is selected from one or more of sodium persulfate, potassium persulfate, ammonium persulfate, and hydrogen peroxide. Preferably, the reducer in the redox initiation system is selected from one or more of ferrous sulfate, ferrous chloride, sodium sulfite, sodium bisulfite, potassium sulfite, and sodium thiosulfate. To give a better play to the synergistic effect between the oxidizer and the reducer in the redox initiation system, preferably the molar ratio of the oxidizer to the reducer is 1:0.2-1, more preferably is 1:0.3-0.8, even more preferably is 1:0.4-0.6. Though the oxidizer and reducer may be introduced in a form of solid into the reaction system, they may be introduced in a form of water solution, for example, 0.12-0.22 mol/L water solution of the oxidizer, and 0.05-0.2 mol/L water solution of the reducer.

According to the present invention, in the method for preparing the weak-crosslinked copolymer, the redox initiation system may be adjusted properly according to the required weak-crosslinked copolymer; preferably, based on total 1 mole of the compound represented by formula (1'), compound represented by formula (2') and compound represented by formula (3'), the amount of the redox initiation system is 1-10 mmol, more preferably is 2-5 mmol, even more preferably is 2-3 mmol.

According to the present invention, in the method for preparing the weak-crosslinked copolymer, the emulsifier may be any conventional emulsifier in the art, as long as the weak-crosslinked copolymer required in the present invention can be obtained through the emulsion polymerization; preferably, the emulsifier is one or more of sorbitan fatty acid ester (e.g., SPAN-60, SPAN-80, SPAN-85, etc.), alkylphenol polyoxyethylene ether, polyoxyethylene sorbitan fatty acid ester (e.g., TWEEN40, TWEEN60, TWEEN80, etc.), and polyglycerol fatty acid ester. The amount of the emulsifier may also be adjusted properly according to the required weak-crosslinked copolymer; preferably, the weight ratio of the aqueous solution to the emulsifier is 100:10-20, more preferably is 100:12-14.

According to the present invention, in order to form an emulsion polymerization system, preferably the method further comprises: performing the emulsion polymerization in the presence of an oil reagent. For example, the oil reagent is liquefied petrolatum. Preferably, the weight ratio of the emulsifier to the oil reagent is 100:500-2,000, more preferably is 100:800-1,500.

According to the present invention, in the method for preparing the weak-crosslinked copolymer, preferably the conditions of the emulsion polymerization include: temperature of 30-60° C. (preferably 35-50° C.), and time of 5-10 h (preferably 7-9 h).

According to the present invention, in the method for preparing the weak-crosslinked copolymer, in order to maintain the activity of the initiator and the like, the method may further comprise: subjecting the emulsion polymerization to be in inert atmosphere; for example, one or more of nitrogen, helium, neon and argon may be charged into the system to displace the atmosphere in the system (for example, that process may be performed for 5-300 min., mainly for removing oxygen).

According to the present invention, in the method for preparing the weak-crosslinked copolymer, in order to control the emulsion polymerization in a better way, preferably the method comprises: at pH equal to 6-8 (pH is about 7), mixing the compound represented by formula (1'), the compound represented by formula (2'), the compound represented by formula (3'), the aqueous solution, the oxidizer in the redox initiation system, and the cross-linker first (for example, the mixing conditions may include: mixing for 30-60 min at 10-40° C. while stirring at 200-250 rpm) (more preferably, mixing the compound represented by formula (1'), the compound represented by formula (2'), the compound represented by formula (3'), and the aqueous solution, and adjusting the pH of the mixture to 6-8 first, and then introducing the oxidizer in the redox initiation system and the cross-linker and mixing); then, introducing the emulsifier and the oil reagent and emusifying the mixture (for example, the emulsification may be executed on an emulsification instrument for 1-5 min); next, introducing the reducer in the redox initiation system in inert atmosphere and performing the emulsion polymerization.

According to the present invention, in the method for preparing the weak-crosslinked copolymer, the emulsion prepared through the above-mentioned emulsion polymerization contains the weak-crosslinked copolymer described in the present invention, and the weak-crosslinked copolymer can be extracted; of course, for the purpose of convenience, the emulsion may be directly used as a bridging agent.

According to the present invention, in the method for preparing the weak-crosslinked copolymer, though there is no particular restriction in the present invention, the weak-crosslinked copolymer may be deemed as one of the weak-crosslinked copolymers introduced above or a mixture of several weak-crosslinked copolymers. Of course, it should be appreciated that the weak-crosslinked copolymer prepared with the above-mentioned method usually refers to a direct product obtained with the method without purification. Though such a product may be a mixture of several weak-crosslinked copolymers, such a case is also included in the scope of the present invention.

According to the present invention, the nano-plugging agent are modified silicon dioxide nano-particles, since the modifying groups on the modified silicon dioxide nano-particles include acrylic copolymer chains, it is equivalent to that the acrylic copolymer chain is grafted on the nano-silicon dioxide; thereby, a spatial network structure attained by virtue of noncovalent bonds such as hydrophilic and hydrophobic groups and hydrogen bonds, etc. and the adsorptive effect of amido groups, so that the modified silicon dioxide nano-particles will not agglomerate easily or will not agglomerate into large-grained agglomerates but maintain high dispersity when the modified silicon dioxide nano-particles are used as plugging agent in a drilling fluid; therefore, when the drilling fluid is inserted into shale, the plugging agent can plug the crevices in the shale satisfactorily, and can work with other constituents in the drilling fluid, especially the bridging agent, the rheological modifier, the bionic wall bracing agent and the bionic shale inhibitor in the composition, to attain the purpose of improving the bearing capability of the formation, stabilize the well wall, prevent leakage from the well, and protect the oil and gas reservoir.

To attain the object described above in a better way, in the nano-plugging agent, preferably, $L^1$ is selected from —OH, C1-C6 alkoxy, or —N($L^3$)$L^2$, $L^2$ and $L^3$ are independently selected from H, C1-C6 alkyl, and C1-C6 alkyl substituted by a substituent, and the substituent is one or more of —COOH, —OH, and —SO$_3$H; L is C1-C6 alkylene.

More preferably, L$^1$ is selected from —OH, C1-C4 alkoxy, or —N(L$^3$)L$^2$, L$^2$ and L$^3$ are independently selected from H, C1-C4 alkyl, and C1-C4 alkyl substituted by a substituent, and the substituent is one or more of —COOH, —OH, and —SO$_3$H; L is C1-C4 alkylene.

Further more preferably, L$^1$ is selected from —OH, methoxy, ethoxy, propoxy, or —N(L$^3$)L$^2$, L$^2$ and L$^3$ are independently selected from H, methyl, ethyl, propyl, isopropyl, isobutyl, tert-butyl, methyl substituted by a substituent, ethyl substituted by a substituent, propyl substituted by a substituent, isopropyl substituted by a substituent, isobutyl substituted by a substituent, and tert-butyl substituted by a substituent, and the substituent in the substituted C1-C4 alkyl is —COOH and/or —SO$_3$H; L is —CH$_2$—, —CH$_2$—CH$_2$—, —CH$_2$—CH$_2$—CH$_2$—, —CH(CH$_3$)—CH$_2$—, —C(CH$_3$)$_2$—CH$_2$—, —CH$_2$—C(CH$_3$)$_2$— or —CH$_2$—CHCH$_3$—CH$_2$—. In this present disclosure, "L is C0 alkylene" means that the groups at the two ends of L are directly linked, also can be understood as that L doesn't exist or is a linking bond.

Wherein, examples of —N(L$^3$)L$^2$ may include: —NH—CH$_3$, —NH—CH$_2$—CH$_3$, —NH—(CH$_2$)$_2$—CH$_3$, —NH—(CH$_2$)$_3$—CH$_3$, —NH—CH(CH$_3$)—CH$_3$, —NH—C(CH$_3$)$_2$—CH$_3$, —NH—C(CH$_3$)$_2$—COOH, and —NH—C(CH$_3$)$_2$—CH$_2$—SO$_3$H.

Wherein, examples of the C1-C10 alkyl may include: methyl, ethyl, propyl, isopropyl, butyl, isobutyl, sec-butyl, tert-butyl, amyl, hexyl, heptyl, octyl, nonyl, and decyl.

Wherein, examples of the C1-C10 alkoxy may include: methoxy, ethoxy, propoxy, isopropoxy, butoxy, isobutoxy, sec-butoxy, tert-butoxy, pentyloxy, hexyloxy, heptyloxy, octyloxy, nonyloxy, and decyloxy.

According to the present invention, the monomers represented by formula (A) are preferably selected from one or more of compounds represented by the following formula:

Formula (A-1): in the formula (A), L$^1$ is —OH (also referred to as acrylic acid);

Formula (A-2): in the formula (A), L$^1$ is methoxy (also referred to as methyl acrylate);

Formula (A-3): in the formula (A), L$^1$ is ethoxy (also referred to as ethyl acrylate);

Formula (A-4): in the formula (A), L$^1$ is propoxy (also referred to as propyl acrylate);

Formula (A-5): in the formula (A), L$^1$ is —NH—CH$_3$ (also referred to as N-methacrylamide);

Formula (A-6): in the formula (A), L$^1$ is —NH—CH$_2$—CH$_3$ (also referred to as N-ethylacrylamide);

Formula (A-7): in the formula (A), L$^1$ is —NH—C(CH$_3$)$_2$—COOH (also referred to as 2-acrylamide-2-methylpropionic acid);

Formula (A-8): in the formula (A), L$^1$ is —NH—C(CH$_3$)$_2$—CH$_2$—SO$_3$H (also referred to as 2-acrylamide-2-methyl propanesulfonic acid).

According to the present invention, the monomers represented by formula (B) are preferably selected from one or more of compounds represented by the following formula:

Formula (B-1): L is —CH$_2$— (also referred to as N,N'-methylene-bisacrylamide);

Formula (B-2): L is —CH$_2$—CH$_2$— (also referred to as N,N'-ethylidene-bisacrylamide).

According to the present invention, in a preferred embodiment of the present invention, in the modified silicon dioxide nano-particles, the structural units in the acrylic copolymer chain comprise one or more of structural units represented by the following formula (A-a) and structural units represented by the following formula (B-a):

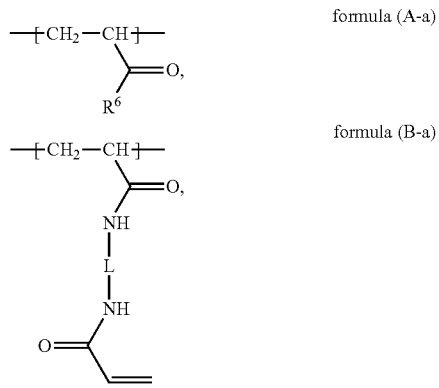

wherein L$^1$ and L are those as defined above. It is seen: in the preferred embodiment, the acrylic copolymer chain is a linear copolymer chain consisting of one or more of the structural units represented by formula (A-a) and one or more of the structural units represented by formula (B-a), and may be a random linear copolymer chain, or a block linear copolymer chain, or an alternating linear copolymer chain. There is no particular restriction on the specific structure of the linear copolymer chain. However, for convenience, preferably the linear copolymer chain is a random linear copolymer chain.

Wherein, the structural units represented by formula (A-a) and the structural units represented by formula (B-a) are optimized depending upon the monomers represented by formula (A) and the monomers represented by formula (B) described above respectively.

According to the present invention, as long as the acrylic copolymer chain consists of the structural units provided by the monomers represented by formula (A) and the structural units provided by the monomers represented by formula (B), the acrylic copolymer chain can be used as the modifying group on the silicon dioxide nano-particles to modify the surfaces of the silicon dioxide nano-particles, so as to avoid a phenomenon that the silicon dioxide nano-particles agglomerate into large-grain agglomerates when they are used as nano-plugging agent in a drilling fluid and exhibit the plugging effect of the modified silicon dioxide nano-particles; however, in order to enable the modified silicon dioxide nano-particles to have better ion compatibility (mainly evaluated by observing the cooperating effect with other drilling fluid additives), better high temperature stability, and better salt resistance property when the modified silicon dioxide nano-particles are used as nano-plugging agent, and thereby work with the bridging agent, the bionic wall bracing agent and the bionic shale inhibito in the composition in a better way to reduce filter loss of the drilling fluid, attain a favorable plugging effect, and solve wellbore instability problems during well drilling, preferably, in the acrylic copolymer chain, the molar ratio of the structural units provided by the monomers represented by formula (A) to the structural units provided by the monomers represented by formula (B) is 1:0.5-5, more preferably is 1:1-2, further more preferably is 1:1.3-1.6, optimally is 1:1.5-1.6.

According to the present invention, the molecular weight of the acrylic copolymer chain may vary within a wide range, as long as the above-mentioned effect can be attained;

preferably, the weight-average molecular weight of the acrylic copolymer chain is 100,000-1,500,000 g/mol, more preferably is 120,000-1,400,000 g/mol, further more preferably is 180,000-1,000,000 g/mol, more preferably is 300,000-1,000,000 g/mol, more preferably is 500,000-900,000 g/mol, more preferably is 600,000-800,000 g/mol, and may be 650,000-760,000 g/mol, for example. If the weight-average molecular weight of the acrylic copolymer chain is within the above-mentioned ranges, especially within the preferred ranges, the modified silicon dioxide nano-particles have excellent performance when they are used as nano-plugging agent.

According to the present invention, the content of the acrylic copolymer chains on the modified silicon dioxide nano-particles may vary within a wide range, as long as a nano-plugging agent with excellent performance can be obtained; preferably, based on the total weight of the modified silicon dioxide nano-particles, the content of the acrylic copolymer chains is 60 wt. % or higher, more preferably is 80 wt. % or higher, even more preferably is 90 wt. % or higher, further more preferably is 90-98 wt. %, optimally is 90-95 wt. %.

According to the present invention, the size of the modified silicon dioxide nano-particles may be adjusted according to the crevice condition of the rock stratum; however, it is common knowledge in the art that the average pore throat size of mud shale is usually within a range of 10-30 nm; since the modified silicon dioxide nano-particles in the present invention can be dispersed well in the drilling fluid and will not agglomerate into large agglomerated particles when they are used as plugging agent, the modified silicon dioxide nano-particles in the present invention may have a wide range of particle diameter, and can attain a good plugging effect even within the wide range of particle diameter. Thus, preferably, the particle diameter of the modified silicon dioxide nano-particles is 3-30 nm, more preferably is 10-30 nm.

According to the present invention, the modified silicon dioxide nano-particles that serve as a nano-plugging agent may be prepared with a conventional method in the art; preferably, the method for preparing the modified silicon dioxide nano-particles is as follows:

(1) subjecting one or more of monomers represented by formula (A) and one or more of monomers represented by formula (B) to have a contact reaction with silicon dioxide nano-particles, in the presence of a monohydric alcohol and a coupler;

(B) subjecting the product of the contact reaction to have a polymerization reaction, in the presence of a redox initiator system.

According to the present invention, formulae (A) and (2) and the groups involved in them are those as described above, and will not be detailed further here.

According to the present invention, in the step (A) in the method for preparing the modified silicon dioxide nano-particles, there is no particular restriction on the amount of the monomers represented by formulae (A) and (B), which is to say, the amount may be selected according to the modified silicon dioxide nano-particles described above. For example, to obtain the acrylic copolymer chain consisting of structural units at a certain molar ratio described above and obtain the acrylic copolymer chain with appropriated molecular weight described above, preferably the molar ratio of the monomers represented by formula (A) to the monomers represented by formula (B) is 1:0.5-5, more preferably is 1:1-2, further more preferably is 1:1.3-1.6, optimally is 1:1.5-1.6. For example, to make the modified silicon dioxide nano-particles modified by the acrylic copolymer chains described above, preferably, based on the total amount of the silicon dioxide nano-particles, the monomers represented by formula (A) and the monomers represented by formula (B), the total amount of the monomers represented by formula (A) and the monomers represented by formula (B) is 60 wt. % or higher, more preferably is 80 wt. % or higher, even more preferably is 90 wt. % or higher, further more preferably is 90-98 wt. %, optimally is 90-95 wt. %; in other words, the content of the silicon dioxide nano-particles is 40 wt. % or lower, preferably is 20 wt. % or lower, more preferably is 10 wt. % or lower, even more preferably is 2-10 wt. %, and may be 5-10 wt. %, for example.

According to the present invention, in the method for preparing the modified silicon dioxide nano-particles, the size of the silicon dioxide nano-particles may be selected according to the size of the required modified silicon dioxide nano-particles; preferably, the particle diameter of the silicon dioxide nano-particles is 3-30 nm, more preferably is 10-30 nm.

According to the present invention, in the step (1) in the method for preparing the modified silicon dioxide nano-particles, in the presence of a coupler, one or more of the monomers represented by formula (A) and one or more of the monomers represented by formula (B) are subjected to contact with silicon dioxide nano-particles firstly (e.g., by mixing), so that active grafting sites are formed on the silicon dioxide nano-particles under the action of the coupler, and the silicon dioxide nano-particles would able to contact sufficiently with the monomers represented by formula (A) and the monomers represented by formula (B); in addition, in the presence of the monohydric alcohol, the reaction rate of the contact reaction and the reaction rate of the follow-up polymerization reaction can be controlled reasonably, so that modified silicon dioxide nano-particles required in the present invention, which will not agglomerate into large particles and have excellent plugging performance, can be obtained.

Wherein, there is no particular restriction on the kind of the monohydric alcohol, as long as the above-mentioned effect can be attained; preferably, the monohydric alcohol is one or more of methanol, ethanol, n-propanol and isopropanol, more preferably is one or more of isopropanol, n-propanol and ethanol. There is no particular restriction on the amount of the monohydric alcohol, as long as the reaction rates of the contact reaction and the polymerization reaction can be controlled and optimized to obtain silicon dioxide nano-particles modified by acrylic copolymer chains. Preferably, the weight ratio of the silicon dioxide nano-particles to the monohydric alcohol is 1:5-30, more preferably is 1:8-25, even more preferably is 1:10-20, and may be 1:15-20, for example.

Wherein, there is no particular restriction on the kind of the coupler, as long as the above-mentioned effect can be attained. For example, the coupler may be one or more of silane coupler and the like, preferably is silane coupler, more preferably is one or more of γ-aminopropyl-triethoxysilane (also referred to as KH550), γ-glycidol ether propoxy-trimethoxysilane (also referred to as KH560), γ-(methylacryloyloxy)propyl-trimethoxysilane (also referred to as KH570), and N-(β-aminoethyl)-γ-aminopropyl-trimethoxysilane (also referred to as KH792). There is no particular restriction on the amount of the coupler, as long as the silicon dioxide nano-particles are activated appropriately to obtain an appropriate amount of sites where the acrylic copolymer chain can be grafted. Preferably, the weight ratio of the silicon dioxide nano-particles to the coupler is 100:0.2-10, more preferably is 100:0.4-5, even more preferably is 100:1-4, optimally is 100:1.2-3, and may be 100:1.2-2, for example.

According to the present invention, in the method for preparing the modified silicon dioxide nano-particles, though the step (1) may be implemented by adding the monohydric alcohol, coupler, one or more of the monomers represented by formula (A), and one or more of the monomers represented by formula (B) together into the reaction system, alternatively they may be mixed in separate steps freely and then the obtained mixtures may be mixed together. There is no particular restriction on the specific implementation in the present invention. However, to ensure that more ideal modified silicon dioxide nano-particles can be obtained after the contact reaction and the polymerization reaction, preferably, the step (1) comprises: mixing the monomers represented by formula (A) and the monomers represented by formula (B) firstly (e.g., mixing at 10-40° C. (preferably 20-30° C.) while stirring at a speed of 200-500 rpm (preferably 250-350 rpm) for 10-40 min (preferably 20-30 min)), and adjusting the pH of the obtained mixture to 7-9, preferably 7-8, more preferably 7-7.5 (e.g., one or more of sodium hydroxide, potassium hydroxide, and lithium hydroxide, etc. can be used to make the adjustment); then, subjecting the mixture to have a contact reaction with the silicon dioxide nano-particles, in the presence of a monohydric alcohol and a coupler. To facilitate the operation on the well drilling site, more preferably, the step (1) comprises: preparing a mixture (hereinafter referred to as mixture A) of monomers represented by formula (A) and monomers represented by formula (B); preparing a mixture (hereinafter referred to as mixture B) of the monohydric alcohol and the silicon dioxide nano-particles (e.g., stirring for 10-40 min (preferably 20-30 min) at 200-500 rpm (preferably 250-350 rpm) stirring speed at 10-40° C. (preferably 20-30° C.)); mixing the mixture A with the mixture B to prepare a mixture C (e.g., stirring for 10-40 min (preferably 20-30 min) at 200-500 rpm (preferably 250-350 rpm) stirring speed at 10-40° C. (preferably 20-30° C.)); then, subjecting the mixture C to have the contact reaction in the presence of a coupler.

According to the present invention, in the method for preparing the modified silicon dioxide nano-particles, preferably, in the step (1), the conditions of the contact reaction include: temperature of 10-40° C. (preferably 20-30° C.), and time of 10-60 min (preferably 20-30 min).

According to the present invention, in the step (2) of the method for preparing the modified silicon dioxide nano-particles, under the initiation action of the redox initiator system, the monomers represented by formula (A) and the monomers represented by formula (B) are copolymerized, and grafted on the silicon dioxide nano-particles, so that modified silicon dioxide nano-particles grafted with the acrylic copolymer chains are obtained. Generally, the acrylic copolymer chains in the present invention may be understood as linear polymer chains, but are not limited to linear polymer chains.

According to the present invention, in the method for preparing the modified silicon dioxide nano-particles, there is no particular restriction on the kind of the redox initiator system, as long as the above-mentioned purpose can be attained; preferably, the reducer in the redox initiator system is sodium bisulfite. Preferably, the oxidizer in the redox initiator system is ammonium persulfate. Wherein, the molar ratio of the reducer to the oxidizer preferably is 1:1-5, more preferably is 1:2.5-3. There is no particular restriction on the amount of the redox initiator system, as long as the modified silicon dioxide nano-particles grafted with the acrylic copolymer chains required in the present invention can be obtained; preferably, with respect to 1 mol total amount of the monomers represented by formula (A) and the monomers represented by formula (B), the amount of the redox initiator system is 0.05-1 g, more preferably is 0.07-0.8 g, even more preferably is 0.1-0.4 g, still more preferably is 0.14-0.3 g, and may be 0.2-0.28 g, for example.

According to the present invention, in the method for preparing the modified silicon dioxide nano-particles, preferably, in the step (2), the conditions of the polymerization reaction include: temperature of 40-80° C. (preferably 50-70° C., e.g., 60° C.), and time of 3-6 h (preferably 4-5 h). The polymerization reaction may be carried out while stirring, for example, at 200-400 rpm stirring speed.

According to the present invention, in the method for preparing the modified silicon dioxide nano-particles, to extract the modified silicon dioxide nano-particles from the polymerization reaction system, the method may further comprise: drying the product of the polymerization reaction (e.g., drying for 5-20 h at 50-80° C., preferably at 60-70° C.) and milling it, to obtain the modified silicon dioxide nano-particles. Here, the product of the polymerization reaction is directly dried and milled, and then the obtained particles may be used as the nano-plugging agent in the drilling fluid. Therefore, the product obtained with the above method is directly used as modified silicon dioxide nano-particles, which include silicon dioxide particles with acrylic copolymer chains grafted on the silicon dioxide nano-particles, silicon dioxide nano-particles with acrylic copolymer coated on the particles, and other possible particles.

According to the present invention, the rheological modifier is a dimer acid-organic amine copolymer comprising structural units from dimer acid, structural units from alkylamine, and structural units from arylamine, wherein, the dimer acid is a dimer of oleic acid and linoleic acid, the alkylamine is one or more of C10-C20 alkyl primary amines, the arylamine is aniline and aniline substituted by C1-C3 alkyl at one or more sites on benzene ring. Preferably, the rheological modifier is the dimer acid-organic amine copolymer. Wherein, the dimer acid is a dimer fatty acid containing two carboxyl groups, which is a dimer of oleic acid ($CH_3(CH_2)_7CH=CH(CH_2)_7COOH$) and linoleic acid ($CH_3(CH_2)_4CH=CHCH_2CH=CH(CH_2)_7COOH$). Such a dimer acid may be obtained with a conventional method according to the present invention, such as the method described in the article "Shulin Zhang, Synthesis and Application of Dimer Acid, *Fine Petrochemical Industry*, 1995", or may be a commercial product (preferably the purity is 98 wt % or higher). Preferably, the alkylamine is one or more of dodecyl primary amine, tridecyl primary amine, tetradecyl primary amine, pentadecyl primary amine, hexadecyl primary amine, heptadecyl primary amine, and octodecyl primary amine, more preferably is dodecyl primary amine and/or octodecyl primary amine. Preferably, the arylamine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline, and more preferably is one or more of aniline, 2-methylaniline, 3-methylaniline, and 4-methylaniline.

In a preferred embodiment of the present invention, the dimer acid is a dimer of oleic acid and linoleic acid, the alkylamine is dodecyl primary amine or octodecyl primary amine, and the arylamine is aniline or 3-methylaniline.

According to the present invention, in the dimer acid-organic amine copolymer, preferably, the molar ratio of the structural units from dimer acid to the structural units from alkylamine to the structural units from the dimer acid, structural units from the alkylamine and structural units from the arylamine is 1:0.3-1:0.2-1, more preferably 1:0.3-0.8:0.2-0.7, further more preferably 1:0.4-0.7:0.3-0.6.

According to the present invention, in the dimer acid-organic amine copolymer, preferably, the weight-average molecular weight of the dimer acid-organic amine copolymer is 2,200-9,000 g/mol, and the absolute viscosity thereof is 20,000-150,000 cp p. Considering from the perspective of obtaining a composition more suitable for raising suspending power and temperature resistance of clay-free whole-oil-based drilling fluid, more preferably, the weight-average molecular weight of the dimer acid-organic amine copolymer is 4,000-9,000 g/mol, and the absolute viscosity thereof is 100,000-150,000 cp. More preferably, the weight-average molecular weight of the dimer acid-organic amine copolymer is 5,000-9,000 g/mol, and the absolute viscosity thereof is 100,000-150,000 cp. In the present invention, weight-average molecular weight is measured by GPC (gel permeation chromatography), and absolute viscosity is measured by Brookfield viscometer.

According to the present invention, in the process of preparing the dimer acid-organic amine copolymer, the dimer acid-organic amine copolymer as rheological modifier may be prepared by a conventional method of the ar. For example, the method for preparing the dimer acid-organic amine copolymer comprises: copolymerizing the dimer acid, the alkylamine and the arylamine. In this method, the dimer acid, alkylamine and arylamine have been described above, so no necessary details will be given herein.

According to the present invention, in the process of preparing the dimer acid-organic amine copolymer, the foregoing copolymerization reaction among dimer acid, alkylamine and arylamine is mostly dehydration condensation reaction between carboxylic acids and amines. By copolymerization reaction among dimer acid, alkylamine and arylamine in the present invention alone, a dimer acid-organic amine copolymer with good performance may be obtained as a rheological modifier of whole-oil-based drilling fluid, but in order to obtain a rheological modifier with absolute viscosity and molecular weight more suitable for whole-oil-based drilling fluid, the molar ratio of the dimer acid, alkylamine and arylamine is preferably 1:0.3-1:0.2-1, more preferably 1:0.3-0.8:0.2-0.7, further more preferably 1:0.4-0.7:0.3-0.6.

According to the present invention, in the process of preparing the dimer acid-organic amine copolymer, the copolymerization reaction may adopt a conventional method of the art as long as a dimer acid-organic amine copolymer that may be used as a rheological modifier of the composition can be obtained. Preferably, before copolymerization of dimer acid, alkylamine and arylamine, they are mixed to obtain a monomer mixture; then with the existence of concentrated sulfuric acid, the obtained monomer mixture takes copolymerization reaction.

According to the present invention, in the process of preparing the dimer acid-organic amine copolymer, if the dimer acid, alkylamine and arylamine are mixed at first to obtain monomer mixture, the monomers can more sufficiently contact each other in the subsequent polymerization reaction. As the foregoing monomer mixture is sticky, preferably the mixing is conducted at higher temperature, and particularly preferably the adopted mixing conditions include: a temperature of 100-130° C. and a time of 20-30 min.

According to the present invention, in the process of preparing the dimer acid-organic amine copolymer, when the foregoing concentrated sulfuric acid is used as a catalyst of the copolymerization reaction in the present invention, there is no particular limitation to its dose as long as it can catalyze the copolymerization reaction in the present invention. Preferably, based on the total weight of the dimer acid, alkylamine and arylamine, the dose of the concentrated sulfuric acid is 0.3-1 wt. %. The concentrated sulfuric acid may be a sulfuric acid solution with sulfuric acid concentration of 95 wt. % or above (preferably 98 wt. %).

According to the present invention, in the process of preparing the dimer acid-organic amine copolymer, preferably, the conditions of the copolymerization reaction comprise: a temperature of 150-180° C. and a time of 2-6 h. More preferably, the conditions of the copolymerization reaction comprise: a temperature of 155-175° C. and a time of 2-6 h. Further more preferably, the conditions of the copolymerization reaction comprise: a temperature of 160-170° C. and a time of 2-6 h.

In the process of preparing the dimer acid-organic amine copolymer, in order to promote the copolymerization reaction, byproduct water of copolymerization reaction may be removed from the reaction system. The method for removing byproduct water is a conventional method of the art, so no necessary details will be given here.

In the process of preparing the dimer acid-organic amine copolymer, when the foregoing method is adopted to prepare dimer acid-organic amine copolymer, the rheological modifier may be either the dimer acid-organic amine copolymer prepared by the foregoing method, or a 50-70 wt. % solution obtained by directly using a diluent to dilute the dimer acid-organic amine copolymer prepared by the foregoing method (in other words, based on the total weight of the dimer acid-organic amine copolymer solution after dilution, the content of dimer acid-organic amine copolymer is 50-70 wt. %), or a rheological modifier of the present invention obtained by other methods well known in the art and containing the dimer acid-organic amine copolymer.

In the process of preparing the dimer acid-organic amine copolymer, those skilled in the art should understand that the product of copolymerization reaction is not separated in general and it is believed that all the adopted monomers basically take complete reaction and the product of copolymerization reaction is directly used as copolymer. Therefore, for the sake of convenience, the diluent may be directly added to the products of the copolymerization reaction after the copolymerization reaction in the method for preparing the foregoing dimer acid-organic amine copolymer is completed, and there is no need to purify and separate the dimer acid-organic amine copolymer in it. In a general sense, the dimer acid-organic amine copolymer referred to in the present invention is also the product of the copolymerization reaction without purification and separation, or the product of copolymerization reaction obtained after only byproduct water is removed as described above.

In the process of preparing the dimer acid-organic amine copolymer, the diluent for example may be a diluent conventionally adopted in the art, such as: tall oil and/or tall oil fatty acid.

According to the present invention, the mechanism of action of the bionic wall bracing agent is as follows: the byssus threads of a mussel can adhere to the rock surface in the marine environment, and dopamine—a special amino acid derivative contained in byssus protein—is proved to be the key factor for strong subaqueous adhesion of byssus threads. When a mussel secretes byssus protein from its body onto a seabed rock surface, the dopamine groups in the byssus protein will have a cross-linking cure reaction with $Fe^{3+}$ ions in seawater, and thereby cohesive byssus threads with strong adhesion are formed, so that the mussel adheres to the rock surface. A bionic well wall strengthener developed by simulating the structure of adhesive proteins produced by a mussel can contact with and is absorbed to the surface of clay shale along with the drilling fluid in the borehole drilling process, and is cross-linked and cured under the complexing action between the dopamine groups and the $Fe^{3+}$ ions on the surface of clay shale to form a layer of polymer film in 100 μm-1 mm thickness (the thickness increases as the polymer concentration in the drilling fluid increases), which has strong adhesion. The polymer film not only can effectively prevent the drilling fluid from infiltrating into the formation, but also has enough strength to partially balance off the hydration stress borne on the rock, and thereby attains an effect of plugging the pores in the clay shale of borehole wall and improving the strength of the clay shale.

According to a preferred embodiment of the present invention, the bionic wall bracing agent contains structural units represented by formula (I):

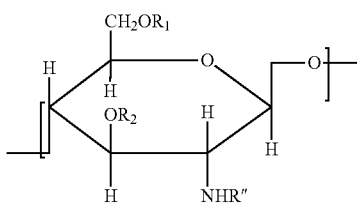

formula (I)

In formula (I), $R_1$ is H,

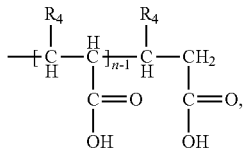

—$CH_2COOR_3'$,

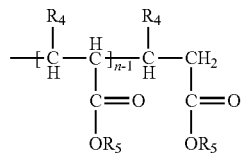

or —$CH_2COOR_3$, $R^2$ is

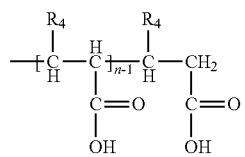

is H,

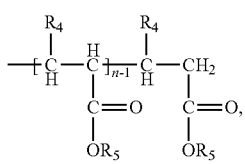

and at least one of $R_1$ and $R_2$ is

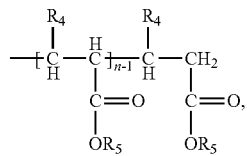

n is an integer equal to or greater than 1, each of the n $R_5$ groups is H or a dopamine-derived group respectively and independently, and at least one of the n $R_5$ groups is the dopamine-derived group, $R_4$ is H or $C_1$-$C_{10}$ alkyl, R''' is H, —$CH_2COOR_3'$ or —$CH_2COOR_3$, and $R_1$ and R''' are not H at the same time, $R_3'$ is H or alkali metal, and $R_3$ is the dopamine-derived group.

The weight-average molecular weight of the bionic wall bracing agent may be 20,000 g/mol-150,000 g/mol, preferably is 50,000 g/mol-100,000 g/mol.

According to the present invention, preferably, in formula (I), $R_4$ is C2-C20 alkyl, more preferably is C2-C6 alkyl. Examples of $R_4$ include, but are not limited to: ethyl, propyl, iso-propyl, and butyl.

According to an embodiment of the present invention, the bionic wall strengthener is prepared with a method comprising the following steps:

(1) initiating a graft copolymerization reaction between a polymer that contains the structural units represented by formula (III) and an unsaturated carboxylic acid represented by general formula $R_4CH=CHCOOH$;

(2) reacting the polymer obtained in step (1) with at least one of dopamine and dopamine hydrochloride;

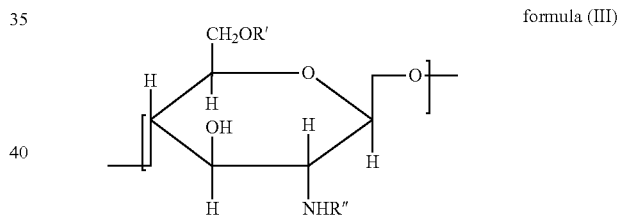

formula (III)

Wherein R' and R'' are H or —$CH_2COOR_3'$ respectively and independently, and R' and R'' are not H at the same time; R3' is H or an alkali metal element; $R_4$ is H or $C_1$-$C_{10}$ alkyl.

In the preparation process of the bionic wall bracing agent, in step (1), the conditions of the graft copolymerization reaction may include: temperature of 50-90° C., preferably 60-80° C.; time of 1-1 h, preferably 2-6 h; the molar ratio of the polymer that contains the structural units represented by formula (III) (calculated by hydroxyl groups) to the unsaturated carboxylic acid may be 1:0.1-4, preferably is 1:0.5-3; the graft copolymerization reaction may proceed in the presence of an initiator, which may be one or more of ammonium ceric nitrate, potassium persulfate, and ammonium persulfate.

Particularly preferably, the polymer that contains the structural units represented by formula (III) is carboxymethyl chitosan. Preferably, the carboxymethyl chitosan is mixed, contacts with, and have a graft copolymerization reaction with the unsaturated carboxylic acid in the form of water solution. The water solution of carboxymethyl chitosan may be obtained by dissolving carboxymethyl chitosan (with 10,000 g/mol-80,000 g/mol weight-average molecular weight) in water while stirring (the stirring speed may be 100-500 rpm). The amount of water can be determined appropriately, as long as the carboxymethyl chitosan can be dissolved completely; preferably, the weight ratio of carboxymethyl chitosan to water is 1:20-50.

The unsaturated carboxylic acid may be an unsaturated monocarboxylic acid with carbon number equal to or greater than 3; the carbon number in the unsaturated carboxylic acid preferably is 3-11, more preferably is 3-7. The examples of the unsaturated carboxylic acid include, but are not limited to acrylic acid and/or methacrylic acid.

In the preparation process of the bionic wall bracing agent, in step (2), the conditions of the condensation reaction may include: temperature of 10-50° C., preferably 20-40° C.; time of 2-48 h, preferably 6-36 h. The mole ratio of the amount of the polymer prepared in step (1) (calculated by carboxyl groups) to the total amount of the dopamine and dopamine hydrochloride (calculated by amine groups) may be 1:0.01-0.2, preferably is 1:0.02-0.1. The condensation reaction may proceed in the presence of a catalyst, which may be 1-ethyl-3-(3-dimethyllaminopropyl) carbonyl diimine hydrochlide or N,N'-diisopropyl carbodiimide.

According to the present invention, the bionic shale inhibitor has nanometer-level pores that have high positive charge density and are easy to enter into mud shale and absorb to the surface of clay minerals, and thereby can greatly compress the surface electric double layer of clay, decrease the swelling pressure of clay, and prevent well wall instability resulted from clay swelling. Furthermore, the bionic shale inhibitor produced from amino acids in organisms can be biodegraded in a short period after it is disposed with the waste drilling fluid by landfill disposal subsequently. Hence the bionic shale inhibitor has favorable environmental friendliness. Thus, it can work well with the bridging agent, the nano-plugging agent, the rheological modifier and the bionic wall bracing agent in the composition, and, when applied in a water-based drilling fluid, can improve the temperature-resistance, plugging, and inhibition performance of the obtained drilling fluid, and is helpful for obtaining a high-density drilling fluid and maintaining high environmental protection performance.

According to the present invention, the weight-average molecular weight of the bionic shale inhibitor is 800-4,000 g/mol, preferably is 1,550-4,000 g/mol, more preferably is 1,600-3,300 g/mol. By confining the weight-average molecular weight of the bionic shale inhibitor disclosed in the present invention within the above-mentioned range, the bionic shale inhibitor can effectively diffuse into pores in mean pore size within 4-10 nm range in shale strata at 2,000 m or greater burial depth, and the bionic shale inhibitor has high adsorptive capacity and adsorptive strength on the surface of clay shale. In contrast, if the weight-average molecular weight of the bionic shale inhibitor is higher than 4,000 g/mol, it will be difficult for the bionic shale inhibitor to diffuse into the pores in mean pore size within 4-10 nm range in shale strata at 2,000 m or greater burial depth. If the weight-average molecular weight of the bionic shale inhibitor is lower than 800 g/mol, the bionic shale inhibitor will not have enough adsorptive strength on the surface of clay shale. The molecular weight distribution index Mw/Mn of the bionic shale inhibitor may be 1.5-3, for example.

According to the present invention, the structural units represented by

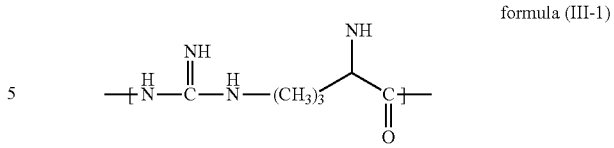

formula (III-1)

have a main chemical structure of arginine, and the structural units represented by

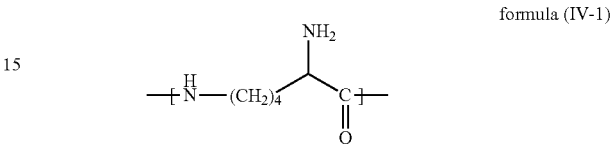

formula (IV-1)

have a main chemical structure of lysine. Hence, actually, the bionic shale inhibitor disclosed in the present subject matter is a type of binary polyamino acid (i.e., condensed peptide of arginine and lysine). In the present subject matter, the structural units represented by formula (III-1) and the structural units represented by formula (IV-1) are selected to constitute the bionic shale inhibitor disclosed in the present subject matter, because: on one hand, the structural units represented by formula (III-1) and the structural units represented by formula (IV-1) are in amino acid structure and easy to be degraded by microbes; therefore, they can be defined as a "bionic shale inhibitor"; on the other hand, the structural unit represented by formula (III-1) has three loci (e.g.,

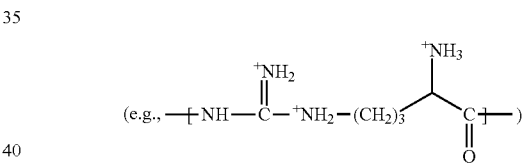

where cationic nitrogen can be formed, and the structural unit represented by formula (IV-1) has one locus (e.g.,

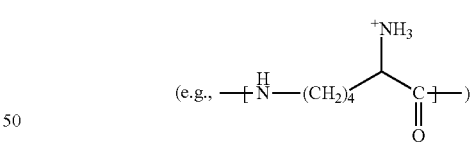

where cationic nitrogen can be formed; hence, by combining the structural units represented by formula (III-1) with the structural units represented by formula (IV-1), a bionic shale inhibitor that has an appropriate quantity of cations and superior shale inhibition capability can be formed. There is no particular restriction on the terminal groups of the bionic shale inhibitor composed of the structural units represented by formula (III-1) and the structural units represented by formula (IV-1) in the present subject matter. In other words, the terminal groups can be ordinary groups, such as H, hydroxyl, or salts, etc.

According to the present invention, though it is only required that the bionic shale inhibitor should have weight-average molecular weight within 800-4,000 g/mol range and should be composed of the structural units represented by formula (III-1) and the structural units represented by formula (IV-1), preferably the mole ratio of the structural units represented by formula (III-1) to the structural units represented by formula (IV-1) is 0.3-5:1, more preferably is 1-5:1, even more preferably is 1-4:1, optimally is 2-4:1, in order to ensure that the bionic shale inhibitor has better shale inhibition capability and can be more easily degraded by microbes subsequently. In a bionic shale inhibitor composed of the structural units represented by formula (III-1) and the structural units represented by formula (IV-1) at the preferred mole ratio, the structural units represented by formula (III-1) and the structural units represented by formula (IV-1) can work more synergistically to improve the shale inhibition capability and biodegradability of the bionic shale inhibitor, and the cost of the bionic shale inhibitor is lower.

There is no particular restriction on the structure of the binary polyamino acid. In other words, the binary polyamino acid can be a regular block copolymer, partially regular block copolymer, or random copolymer. To avoid introducing complexities into the production process, the bionic shale inhibitor disclosed in the present subject matter preferably is a random copolymer.

According to an embodiment of the present invention, the method for preparing the bionic shale inhibitor comprises: initiating a condensation reaction between arginine and lysine in the presence of an inorganic acid catalyst, wherein, the molar ratio of the concentration of the arginine to the concentration of the lysine is 0.2-6:1, and the conditions of the condensation reaction ensure that the weight-average molecular weight of the resultant bionic shale inhibitor is 800-4,000 g/mol.

According to the present invention, in the method for preparing the bionic shale inhibitor, the arginine may be of L-type, D-type, or a mixture of the two types; the lysine may be of L-type, D-type, or a mixture of the two types. Preferably L-arginine and L-lysine are used.

According to the present invention, in the method for preparing the bionic shale inhibitor, there is no particular restriction on the amounts of the arginine and the lysine, as long as the product of the condensation reaction has 800-4,000 g/mol weight-average molecular weight. Preferably, the mole ratio of the arginine to the lysine is 0.3-0.5:1, more preferably is 1-5:1, even more preferably is 1-4:1, optimally is 2-4:1.

According to the present invention, in the method for preparing the bionic shale inhibitor, the condensation reaction is performed in the presence of an inorganic acid catalyst. In the present invention, utilizing an inorganic acid catalyst rather than an alkaline compound has two purposes: one purpose is to promote the condensation reaction between the arginine and the lysine, so as to obtain the bionic shale inhibitor disclosed in the present invention at a higher yield ratio, while avoiding excessively high molecular weight of the polymer obtained through the condensation reaction; the other purpose is to enable the resultant polymer to bear cationic nitrogen at a higher level, so as to provide cations to the bionic shale inhibitor. Specifically, the inorganic acid catalyst may be at least one of sulfuric acid, nitric acid, phosphoric acid and hydrochloric acid at 1-6 mol/L concentration, preferably is phosphoric acid (e.g., 85-98 wt. % concentrated phosphoric acid). When phosphoric acid is used as the inorganic acid catalyst, the bionic shale inhibitor disclosed in the present invention can be obtained at a higher yield ratio.

According to the present invention, in the method for preparing the bionic shale inhibitor, preferably, the mole ratio of the amount of the inorganic acid catalyst to the total amount of arginine and lysine is 1:0.3-3, more preferably is 1:0.4-3.

According to the present invention, in the method for preparing the bionic shale inhibitor, preferably, the inorganic acid catalyst is phosphoric acid, and the mole ratio of the amount of the phosphoric acid to the total amount of the arginine and lysine is 1:2-3. Thus, a bionic shale inhibitor with more appropriate weight-average molecular weight can be obtained.

According to the present invention, in the method for preparing the bionic shale inhibitor, there is no particular restriction on the conditions of the condensation reaction in the present invention, as long as the bionic shale inhibitor with 800-4,000 g/mol weight-average molecular weight can be prepared from the arginine and the lysine at the specified mole ratio. In other words, ordinary conditions for synthesis of an amino acid polymer in the art can be used, for example, a condensation reaction between arginine and lysine in melted state. Preferably, the conditions of the condensation reaction include: temperature of 180-230° C. and time of 4-20 h. More preferably, the conditions of the condensation reaction include: temperature of 195-215° C. and time of 8-16 h.

According to the present invention, in the method for preparing the bionic shale inhibitor, the method for preparing the bionic shale inhibitor provided in the present invention may further comprise: adjusting the pH of the mixture obtained through the condensation reaction to 6-7, after the condensation reaction is finished. In such a case, the ph may be adjusted with any alkaline compound, such as at least one of alkali metal hydroxides (e.g., sodium hydroxide, potassium hydroxide, and lithium hydroxide), alkali oxides (e.g., sodium oxide, potassium oxide, lithium oxide), alkali carbonates (e.g., sodium carbonate, potassium carbonate, and lithium carbonate), and alkali bicarbonates (e.g., sodium bicarbonate and potassium bicarbonate), etc. The alkaline compound may be used in the form of solution or in the form of solid (e.g., powder or grain form, such as sodium hydroxide powder). Preferably, the alkaline compound is used in the form solution; more preferably, the concentration of the alkaline compound solution is 1-10 mol/L. More preferably, the alkaline compound solution is 3-5 mol/L sodium hydroxide solution, 3-5 mol/L potassium hydroxide solution, or saturated sodium carbonate solution. According to the present invention, to obtain the polymer through the condensation reaction, the method may further comprise: concentrating, drying, and grinding the solution after pH adjustment.

According to the present invention, in the method for preparing the bionic shale inhibitor, preferably the method for preparing the bionic shale inhibitor provided in the present invention further comprises: adding water for dissolution when the temperature drops to 125° C. or a lower value after the reaction is completed; separating the obtained water solution and drying the obtained solid, and then dissolving the obtained solid in dimethyl sulfoxide; finally, evaporating the obtained liquid to obtain the bionic shale inhibitor disclosed in the present invention.

According to the present invention, the additive composition may further contain conventional additives used in drilling fluids in the art; for example, the additive composition may contain one or more of bentonite, anti-collapse agent, filler, alkalinity regulator, and weighting agent, etc. When those additional additives are added into a drilling fluid, it can be deemed that the drilling fluid is formed in the form of the additive composition in the present invention; of course, those additional additives may also be deemed as separate components of the drilling fluid rather than the components of the composition in the present invention. All those cases are included in the scope of the present invention.

The present invention further provides use of the composition as an additive in water-based drilling fluids.

The present invention further provides a water-based drilling fluid containing the above-mentioned composition.

According to the present invention, since the water-based drilling fluid contains the additive composition disclosed in the present invention, it can attain an effect of plugging while drilling, and can achieve one-off plugging successfully even in a high pressure environment; in addition, the water-based drilling fluid not only attains plugging, anti-collapse, and wall bracing effects, but also improve surface smoothness and density of the mud cakes. Preferably, based on 100 pbw (parts by weight) water in the drilling fluid, the content of the composition is 10-20 pbw, preferably is 12-15 pbw. Under that condition, based on 100 pbw water in the drilling fluid, preferably the content of the bridging agent is 1-6 pbw, more preferably is 3-5 pbw. Under that condition, based on 100 pbw water in the drilling fluid, preferably the content of the nano-plugging agent is 1-6 pbw, more preferably is 3-5 pbw. Under that condition, based on 100 pbw water in the drilling fluid, preferably the content of the rheological modifier is 0.5-3 pbw, more preferably is 0.5-1.5 pbw. Under that condition, based on 100 pbw water in the drilling fluid, preferably the content of the bionic wall bracing agent is 1-5 pbw, more preferably is 2-3 pbw. Under that condition, based on 100 pbw water in the drilling fluid, preferably the content of the bionic shale inhibitor is 0.5-5 pbw, more preferably is 1-2 pbw.

According to the present invention, the water-based drilling fluid may further contain conventional additives commonly used in water-based drilling fluids. To obtain appropriate density, preferably the drilling fluid further contains a filler, which consists of calcium carbonate of 100-200 mesh and calcium carbonate of 350-500 mesh at a weight ratio of 1:0.5-3. Based on 100 pbw water in the drilling fluid, preferably the content of the filler is 1-5 pbw, more preferably is 2-4 pbw.

According to the present invention, the water-based drilling fluid may contain other conventional additives commonly used in water-based drilling fluids; preferably, the drilling fluid further contains one or more of bentonite, anti-collapse agent, alkalinity regulator, and weighting agent, etc.

Wherein, the bentonite is clay with montmorillonite as the essential mineral component, and has an effect of endowing the drilling fluid with gel strength, filter loss reduction, and wall building capabilities; for example, the bentonite may be sodium bentonite and/or calcium bentonite, preferably is sodium bentonite. Based on 100 pbw water in the drilling fluid, preferably the content of the bentonite is 2-4 pbw, more preferably is 3-4 pbw.

Wherein, the anti-collapse agent can assist the bionic shale inhibitor to prevent collapse of the well bore and improve the stability of the well bore. For example, the anti-collapse agent may be one or more of potassium humate (KHM), silicone (e.g., GF-1), sulfonated bitumen (e.g., FT-1A), and albino asphalt, preferably is albino asphalt. Based on 100 pbw water in the drilling fluid, preferably the content of the anti-collapse agent is 1-5 pbw, more preferably is 2-4 pbw.

Wherein, the alkalinity regulator has effects of stabilizing the emulsion and improving emulsion-breaking voltage; for example, the alkalinity regulator may be $Na_2CO_3$. Preferably, based on 100 pbw water in the water-based drilling fluid, the content of the alkalinity regulator is 0.1-5 pbw, more preferably is 0.15-0.25 pbw.

Wherein, the weighting agent has an effect of adjusting the density of drilling fluid to desired density; for example, the weighting agent may be barite (e.g., barite with 90 wt. % or higher barium sulfate content), etc. For example, based on 100 pbw water in the drilling fluid, preferably the amount of the weighting agent is 40-200 pbw, more preferably is 400-500 pbw.

The above additives may be commercially available products, or may be prepared with conventional methods in the art.

The present invention further provides an application of the water-based drilling fluid in oil and gas well drilling.

With a synergistic effect among the bridging agent, nano-plugging agent, rheological modifier, bionic wall bracing agent, and bionic shale inhibitor in the composition provided in the present invention, a water-based drilling fluid that contains the composition as an additive can attains an excellent plugging effect in a drilling process; in addition, the water-based drilling fluid has high pressure resistance and high temperature resistance properties.

Hereunder the present invention will be detailed in embodiments.

In the following examples:

The weight-average molecular weight values are measured with a gel permeation chromatograph (GPC) (GPC E2695 from Waters Corporation (a US company)).

The infrared spectrums are measured with a MAGNA-IR 560 Fourier transform infrared spectrometer from SpectraLab Scientific.

The $^1$H-NMR spectrums and $^{13}$C-NMR spectrums are measured with an AVANCE 400 NMR spectrometer from Bruker.

The SEM images are obtained with a F20 Field Emission SEM from Hitachi.

The filler consists of calcium carbonate of 200 mesh and calcium carbonate of 400 mesh at a weight ratio of 1:1.

The swelling ratio refers to the ratio of the bulk volume of the weak-crosslinked copolymer after swelling to the bulk volume of the weak-crosslinked copolymer before swelling, which is obtained by measuring a ratio of the median diameter before swelling to the median diameter after swelling with a laser particle size analyzer.

The content of the cross-linker structures refers to the weight percentage of the cross-linker structures provided by the cross-linker in the weak-crosslinked copolymer.

Nano-Plugging Agent Preparation Example 1

(1) 0.12 mol acrylic acid and 0.19 mol N,N'-methylene-bis acrylamide (purchased from Hengtai Taili Chemical Co., Ltd.) are mixed and stirred at about 25° C. for 30 min with 300 rpm stirring speed, and the pH of the mixture is adjusted to 7 with sodium hydroxide; thus, a mixture A1 is obtained; 0.5 g silicon dioxide nano-particles (purchased from Nanjing Tianxing New Materials Co., Ltd with a trade mark TSP, in about 20 nm particle diameter) and 8 g isopropanol are mixed and stirred at about 25° C. for 30 min with 300 rpm stirring speed, to obtain a mixture B1; the mixture A1 and the mixture B1 are mixed and stirred at about 25° C. for 30 min with 300 rpm stirring speed, to obtain a mixture C1;

(2) 0.01 g coupler γ-aminopropyl-triethoxysilane (purchased from Hengtai Taili Chemical Co., Ltd. with a trade mark KH550) and the mixture C1 are mixed and react at 60° C. for 30 min while stirring at 200 rpm stirring speed; then, 0.094 g redox initiator system (consisting of sodium bisulfite and ammonium persulfate at 1:2.5 molar ratio) is added, and then the mixture takes a polymerization reaction at 60° C. for 4 h while stirring at 200 rpm stirring speed;

(3) The product of the polymerization reaction is dried at 70° C. over night (about 24 h), and then is milled; thus, nano-plugging agent S1 are obtained.

Analyzed by infrared, $^1$H-NMR and $^{13}$C-NMR spectroscopy, the modified silicon dioxide nano-particles S1 bear random acrylic copolymer chains composed of structural units represented by formula (A-a) ($L^1$ is selected from —OH) and structural units represented by formula (B-a) (L is —CH$_2$—) at 1:1.5 molar ratio, the content of the acrylic copolymer chain is 92 wt. %, and the weight-average molecular weight of the acrylic copolymer chain is about 650,000 g/mol; the particle diameter of the modified silicon dioxide nano-particles S1 is about 23 nm. SEM image of the modified silicon dioxide nano-particles S1 is shown in FIG. 1.

Rheological Modifier Preparation Example 1

(1) Dimer acid (Pripol 1013 from Shanghai Heribit Chemical Co., Ltd., the same below), dodecyl primary amine, and aniline are added at 1:0.5:0.5 molar ratio into a reaction vessel, and the materials are stirred at 120±2° C. for 30 min.; thus, a homogeneous mixture of monomers is obtained;

(2) Concentrated sulfuric acid (at 98 wt. % concentration, the added amount is 0.5 wt. % of the weight of the mixture of monomers) is added by dropwise into the mixture of monomers (within about 2 min.), with a condensate drain device deployed, the mixture is kept at 160±5° C. for reaction for 2 h; the obtained reaction product is dimer acid-organic amine copolymer, which has 6,500 g/mol weight-average molecular weight and 125,000 cp absolute viscosity.

Tall oil diluent (tall oil F1 from Jinan Jinquan Chemical Co., Ltd, the same below) is added into the dimer acid-organic amine copolymer, to dilute the dimer acid-organic amine copolymer to 50 wt. % concentration; thus, a rheological modifier B1 described in the present invention is obtained, and the rheological modifier liquid is orange liquid.

Bionic Wall Bracing Agent Preparation Example 1

(1) 1,000 kg deionized water is loaded into a container, 50 kg carboxymethyl chitosan (purchased from Beijing datianfengtuo Chemical Technology Co., Ltd., having a structure represented by formula (III), weight-average molecular weight=52,000 g/mol, degree of carboxymethyl substitution=1.4) is added into the container while stirring (at 200 rpm stirring speed), and the mixture is further stirred till the carboxymethyl chitosan is dissolved fully and there is no flocculent solid suspending in the solution).

(2) 50 kg acrylic acid is added into the water solution of carboxymethyl chitosan, the solution is stirred for 5 min, and then 2 kg nitric acid is added and the solution is stirred further for 5 min, till the carboxymethyl chitosan, acrylic acid and nitric acid solution are mixed to a homogeneous state. Then, 4 kg ammonium ceric nitrate is added, and the solution is stirred till the ammonium ceric nitrate is fully dissolved. Next, the reaction system is heated up to 70° C., and timing is started once the temperature in the reactor reaches 70° C.; after 4 h reaction, the reactor is cooled to 25° C. The product in the first stage shall be straw yellow transparent liquid.

(3) 5 kg 1-ethyl-3-(3-dimethyllaminopropyl) carbonyl diimine hydrochlide is added into the reaction system after cooling (5 kg 1-ethyl-3-(3-dimethyllaminopropyl) carbonyl diimine hydrochlide is divided into 5 parts, the reaction system is stirred for 15 min whenever a part is added, and then the next part is added, and so on, till all parts are added). Then, the solution is stirred for 12 h at room temperature, till the 1-ethyl-3-(3-dimethyllaminopropyl) carbodiie hydrochlide is dissolved fully. The product is still straw yellow transparent solution.

(4) 5 kg dopamine hydrochloride is added into the system after the 1-ethyl-3-(3-dimethyllaminopropyl) carbonyl diimine hydrochlide is dissolved, and the system is stirred for 24 h at room temperature for reaction, till a final reaction product bionic wall bracing agent GBFS-1 is generated. The product is straw yellow liquid that has certain viscosity. It is tested that the weight-average molecular weight of the reaction product bionic wall bracing agent GBFS-1 is 84,320 g/mol.

Bionic Shale Inhibitor Preparation Example 1

0.5 mol (87.1 g) L-arginine and 0.2 mol (29.2 g) L-lysine are mixed and stirred at 195° C., 1.75 mol (171.5 g) phosphoric acid (85 wt. % phosphoric acid solution) is added into the mixture, and the mixture is held at 195° C. for 16 h for reaction. After the reaction is completed, 200 g water is added when the temperature drops to about 120° C., and then the mixture is stirred further for 20 min, till the product is fully dissolved in the water. Next, the water solution of the reaction product is taken out, and dried at about 120° C. to obtain solid; next, the solid is dissolved in dimethyl sulfoxide, and the insoluble substance is separated from the solution by suction filtration. Then, the solution is evaporated by rotary evaporation; thus, 91.8 g bionic shale inhibitor YZFS-1 is obtained. Measured by gel permeation chromatography, the weight-average molecular weight Mw is 1,551 g/mol, and the molecular weight distribution index is 1.465. Analyzed by $^1$H-NMR and $^{13}$C-NMR spectroscopy, the molar ratio of the structural units represented by formula (III-1) to the structural units represented by formula (IV-1) in the obtained polymer is 2.47:1.

Bridging Agent Preparation Example 1

Methacrylamide, 2-acrylamide-2-methyl propanesulfonic acid and hexadecyl methacrylate (at a molar ratio of 30:10:1) are added in a total amount of 0.615 mol (about 74 g) into 100 g water, and the pH of the mixture is adjusted to 7; 1.75 mmol potassium persulfate and 0.3 g cross-linker N,N-methylene-bis acrylamide are added into the above mixture, and the obtained materials are mixed for 40 min at 25° C. while stirring at 200 rpm; then, 120 g liquid paraffin (PARAFFIN from Energy Chemical), 8 g sorbitan fatty acid ester (SPAN-80 from Energy Chemical), and 5 g polyoxyethylene sorbitan fatty acid ester (TWEEN60 from Energy Chemical) are added, and the resultant mixture is emulsified for 1 min in an emulsification instrument; next, nitrogen is charged for 15 min to remove oxygen from the emulsified mixture; then, 0.7 mmol sodium bisulfite (in the form of 0.07 mol/L water solution) is added by dropwise adding (within about 10 min), and the materials are held at 50° C. for 8 h for reaction; the resultant emulsion is a bridging agent A1, wherein, the content of the weak-crosslinked copolymer is 23.3 wt. %, the weight-average molecular weight of the weak-cross-linked copolymer is $5\times10^6$ g/mol, and the molecular weight distribution coefficient is 3; through analysis by infrared, $^1$H-NMR and $^{13}$C-NMR spectroscopy, the molar ratio of the structural units represented by formula (1) ($R^1$ is methyl, and $R^{1'}$ is H) to the structural units represented by formula (2) ($R^2$ and $R^{2'}$ are H, $R^3$ is C0 alkylene, and $R^4$ is selected from —CO—NH—C(CH$_3$)$_2$—CH$_2$—SO$_3$M) to the structural units represented by formula (3) ($R^6$ is methyl, $R^{6'}$ is H, and $R^7$ is selected from n-decyl) is 29.4:9.2:1, the content of the cross-linker structures is 0.4 wt. %, and the swelling ratio is 40.

Bridging Agent Preparation Example 2

Methacrylamide, 2-acrylamide-2-methyl propanesulfonic acid and octodecyl methacrylate (at a molar ratio of 15:10:1) are added in a total amount of 0.572 mol (about 76.5 g) into 100 g water, and the pH of the mixture is adjusted to 7; 1.9 mmol ammonium persulfate and 0.34 g cross-linker N,N-ethylidene-bis acrylamide are added into the above mixture, and the obtained materials are mixed for 50 min at 25° C. while stirring at 220 rpm; then, 120 g liquid paraffin (PAR-AFFIN from Energy Chemical), 7 g sorbitan fatty acid ester (SPAN-60 from Energy Chemical), and 7 g polyoxyethylene sorbitan fatty acid ester (TWEEN80 from Energy Chemical) are added, and the resultant mixture is emulsified for 2 min in an emulsification instrument; next, nitrogen is charged for 15 min to remove oxygen from the emulsified mixture; then, 0.95 mmol sodium thiosulfate (in the form of 0.095 mol/L water solution) is added by dropwise (within about 12 min), and the materials are held at 35° C. for 9 h for reaction; the resultant emulsion is a bridging agent A2, wherein, the content of the weak-crosslinked copolymer is 23.9 wt. %, the weight-average molecular weight of the weak-cross-linked copolymer is $4\times10^6$ g/mol, and the molecular weight distribution coefficient is 2; through analysis by infrared, $^1$H-NMR and $^{13}$C-NMR spectroscopy, the molar ratio of the structural units represented by formula (1) ($R^1$ and $R^{1'}$ are H) to the structural units represented by formula (2) ($R^2$ and $R^{2'}$ are H, $R^3$ is C0 alkylene, and $R^4$ is selected from —CO—NH—C(CH$_3$)$_2$—CH$_2$—SO$_3$M) to the structural units represented by formula (3) ($R^6$ is methyl, $R^{6'}$ is H, and $R^7$ is selected from n-dodecyl) is 14.2:9.1:1, the content of the cross-linker structures is 0.44 wt. %, and the swelling ratio is 35.

Bridging Agent Preparation Example 3

Acrylamide, acrylic acid and dodecyl methacrylate (at a molar ratio of 13:6:1) are added in a total amount of 0.8 mol (about 64.4 g) into 100 g water, and the pH of the mixture is adjusted to 7; 1.5 mmol potassium persulfate and 0.23 g cross-linker N,N-methylene-bis acrylamide are added into the above mixture, and the obtained materials are mixed for 60 min at 20° C. while stirring at 210 rpm; then, 120 g liquid paraffin (PARAFFIN from Energy Chemical), 7 g sorbitan fatty acid ester (SPAN-80 from Energy Chemical), and 5 g polyoxyethylene sorbitan fatty acid ester (TWEEN60 from Energy Chemical) are added, and the resultant mixture is emulsified for 1 min in an emulsification instrument; next, nitrogen is charged for 20 min to remove oxygen from the emulsified mixture; then, 0.9 mmol sodium bisulfite (in the form of 0.09 mol/L water solution) is added by dropwise (within about 10 min), and the materials are held at 45° C. for 7 h for reaction; the resultant emulsion is a bridging agent A3, wherein, the content of the weak-crosslinked copolymer is 21 wt. %, the weight-average molecular weight of the weak-crosslinked copolymer is $5.5\times10^6$ g/mol, and the molecular weight distribution coefficient is 4; through analysis by infrared, $^1$H-NMR and $^{13}$C-NMR spectroscopy, the molar ratio of the structural units represented by formula (1) ($R^1$ and $R^{1'}$ are H) to the structural units represented by formula (2) ($R^2$ and $R^{2'}$ are H, $R^3$ is C0 alkylene, and $R^4$ is selected from —COOH) to the structural units represented by formula (3) ($R^6$ is methyl, $R^{6'}$ is H, and $R^7$ is selected from n-hexyl) is 12.1:5.4:1, the content of the cross-linker structures is 0.36 wt. %, and the swelling ratio is 45.

Bridging Agent Preparation Example 4

The method described in the bridging agent preparation example 1 is used, but the difference is that the amount of potassium persulfate is 2.4 mmol, and the amount of sodium bisulfite is 0.96 mmol; the resultant emulsion is a bridging agent A4, wherein, the content of the weak-crosslinked copolymer is 23.3 wt. %, the weight-average molecular weight of the weak-crosslinked copolymer is $3.6\times10^6$ g/mol, and the molecular weight distribution coefficient is 2.8; through analysis by infrared, $^1$H-NMR and $^{13}$C-NMR spectroscopy, the molar ratio of the structural units represented by formula (1) ($R^1$ is methyl, and $R^{1'}$ is H) to the structural units represented by formula (2) ($R^2$ and $R^{2'}$ are H, $R^3$ is C0 alkylene, and $R^4$ is selected from —CO—NH—C(CH$_3$)$_2$—CH$_2$—SO$_3$M) to the structural units represented by formula (3) ($R^6$ is methyl, $R^{6'}$ is H, and $R^7$ is selected from n-decyl) is 29.1:9.3:1, the content of the cross-linker structures is 0.4 wt. %, and the swelling ratio is 38.

Bridging Agent Preparation Example 5

The method described in the bridging agent preparation example 1 is used, but the difference is that the amount of potassium persulfate is 1 mmol, and the amount of sodium bisulfite is 0.34 mmol; the resultant emulsion is a bridging agent A5, wherein, the content of the weak-crosslinked copolymer is 23.3 wt. %, the weight-average molecular weight of the weak-crosslinked copolymer is $6.5\times10^6$ g/mol, and the molecular weight distribution coefficient is 3.1; through analysis by infrared, $^1$H-NMR and $^{13}$C-NMR spectroscopy, the molar ratio of the structural units represented by formula (1) ($R^1$ is methyl, and $R^{1'}$ is H) to the structural units represented by formula (2) ($R^2$ and $R^{2'}$ are H, $R^3$ is C0 alkylene, and $R^4$ is selected from —CO—NH—C(CH$_3$)$_2$—CH$_2$—SO$_3$M) to the structural units represented by formula (3) ($R^6$ is methyl, $R^{6'}$ is H, and $R^7$ is selected from n-decyl) is 29:9.4:1, the content of the cross-linker structures is 0.4 wt. %, and the swelling ratio is 41.

Bridging Agent Comparative Preparation Example 1

The method described in the bridging agent preparation example 1 is used, but the difference is that n-butyl methylacrylate is used in replacement of octodecyl methacrylate; the resultant emulsion is a bridging agent DA1, wherein, the content of the weak-crosslinked copolymer is 22.8 wt. %, the weight-average molecular weight of the weak-cross-linked copolymer is $4.7\times10^6$ g/mol, and the molecular weight distribution coefficient is 3.2; through analysis by infrared, $^1$H-NMR and $^{13}$C-NMR spectroscopy, the molar ratio of the structural units represented by formula (1) ($R^1$ is methyl, and $R^{1'}$ is H) to the structural units represented by formula (2) ($R^2$ and $R^{2'}$ are H, $R^3$ is C0 alkylene, and $R^4$ is selected from —CO—NH—C(CH$_3$)$_2$—CH$_2$—SO$_3$M) to the structural units provided by octodecyl methacrylate is 29.1:9:1, the content of the cross-linker structures is 0.4 wt. %, and the swelling ratio is 39.

Bridging Agent Comparative Preparation Example 2

The method described in the bridging agent preparation example 1 is used, but the difference is that 2-acrylamide-2-methyl propanesulfonic acid is not used; instead, methacrylamide and hexadecyl methacrylate at a molar ratio of 30:1 are used as monomers; the resultant emulsion is a bridging agent DA2, wherein, the content of the weak-crosslinked copolymer is 19 wt. %, the weight-average molecular weight of the weak-crosslinked copolymer is 4.4×10$^6$ g/mol, and the molecular weight distribution coefficient is 2.7; through analysis by infrared, $^1$H-NMR and $^{13}$C-NMR spectroscopy, the molar ratio of the structural units represented by formula (1) (R$^1$ is methyl, and R$^{1'}$ is H) to the structural units provided by octodecyl methacrylate is 28.6:1, the content of the cross-linker structures is 0.4 wt. %, and the swelling ratio is 44.

Bridging Agent Comparative Preparation Example 3

The method described in the preparation example 1 is used, but the difference is that the amount of the cross-linker N,N-methylene-bis acrylamide is 0.05 g; the resultant emulsion is a bridging agent DA3, wherein, the content of the weak-crosslinked copolymer is 23.3 wt. %, the weight-average molecular weight of the weak-crosslinked copolymer is 5.05×10$^6$ g/mol, and the molecular weight distribution coefficient is 2.86; through analysis by infrared, $^1$H-NMR and $^{13}$C-NMR spectroscopy, the molar ratio of the structural units represented by formula (1) (R$^1$ is methyl, and R$^{1'}$ is H) to the structural units represented by formula (2) (R$^2$ and R$^{2'}$ are H, R$^3$ is C0 alkylene, and R$^4$ is selected from —CO—NH—C(CH$_3$)$_2$—CH$_2$—SO$_3$M) to the structural units represented by formula (3) (R$^6$ is methyl, R$^{6'}$ is H, and R$^7$ is selected from n-decyl) is 29:9:1, the content of the cross-linker structures is 0.068 wt. %, and the swelling ratio is 28.

Bridging Agent Comparative Preparation Example 4

The method described in the preparation example 1 is used, but the difference is that the amount of the cross-linker N,N-methylene-bis acrylamide is 1 g; the resultant emulsion is a bridging agent DA4, wherein, the content of the weak-crosslinked copolymer is 23.3 wt. %, the weight-average molecular weight of the weak-crosslinked copolymer is 4.72×10$^6$ g/mol, and the molecular weight distribution coefficient is 3.2; through analysis by infrared, $^1$H-NMR and $^{13}$C-NMR spectroscopy, the molar ratio of the structural units represented by formula (1) (R$^1$ is methyl, and R$^{1'}$ is H) to the structural units represented by formula (2) (R$^2$ and R$^{2'}$ are H, R$^3$ is C0 alkylene, and R$^4$ is selected from —CO—NH—C(CH$_3$)$_2$—CH$_2$—SO$_3$M) to the structural units represented by formula (3) (R$^6$ is methyl, R$^{6'}$ is H, and R$^7$ is selected from n-decyl) is 29.3:9:1, the content of the cross-linker structures is 1.4 wt. %, and the swelling ratio is 53.

Drilling Fluid Example 1

This example is provided to describe the composition and the drilling fluid in the present invention.

The formulation is: 100 pbw water, 3 pbw nano-plugging agent S1, 1 pbw rheological modifier B1, 2 pbw bionic wall bracing agent GBFS-1, 1.5 pbw bionic shale inhibitor YZFS-1, 5 pbw bridging agent A1, 3 pbw sodium bentonite (purchased from Weifang Huawei Research Center of Bentonite Technology), 0.2 pbw Na$_2$CO$_3$, 3 pbw filler, 3 pbw albino asphalt (DWF-1 from Shandong Deshunyuan Petroleum Technology Co., Ltd.), and 52.5 pbw barite (ZR-43 from Sichuan Zhengrong Industrial Co., Ltd.); thus, a water-based drilling fluid Y1-1 is prepared, and the density of the drilling fluid is 1.4 g/cm$^3$; the content of the barite is adjusted to 105 pbw, so that a water-based drilling fluid Y1-2 is prepared, and the density of the drilling fluid is 1.8 g/cm$^3$.

Drilling Fluid Example 2

This example is provided to describe the composition and the drilling fluid in the present invention.

The formulation is: 100 pbw water, 5 pbw nano-plugging agent S1, 0.5 pbw rheological modifier B1, 2.5 pbw bionic wall bracing agent GBFS-1, 1 pbw bionic shale inhibitor YZFS-1, 4 pbw bridging agent A2, 4 pbw sodium bentonite (from Weifang Huawei Research Center of Bentonite Technology), 0.25 pbw Na$_2$CO$_3$, 2 pbw filler, 3 pbw albino asphalt (DWF-1 from Shandong Deshunyuan Petroleum Technology Co., Ltd.), and 52.5 pbw barite (ZR-43 from Sichuan Zhengrong Industrial Co., Ltd.); thus, a water-based drilling fluid Y2-1 is prepared, and the density of the drilling fluid is 1.4 g/cm$^3$; the content of the barite is adjusted to 105 pbw, so that a water-based drilling fluid Y2-2 is prepared, and the density of the drilling fluid is 1.8 g/cm$^3$.

Drilling Fluid Example 3

The formulation is: 100 pbw water, 4 pbw nano-plugging agent S, 1.5 pbw rheological modifier B1, 3 pbw bionic wall bracing agent GBFS-1, 2 pbw bionic shale inhibitor YZFS-1, 3 pbw bridging agent A3, 3 pbw sodium bentonite (from Weifang Huawei Research Center of Bentonite Technology), 0.15 pbw Na$_2$CO$_3$, 4 pbw filler, 2 pbw albino asphalt (DWF-1 from Shandong Deshunyuan Petroleum Technology Co., Ltd.), and 52.5 pbw barite (ZR-43 from Sichuan Zhengrong Industrial Co., Ltd.); thus, a water-based drilling fluid Y3-1 is prepared, and the density of the drilling fluid is 1.4 g/cm$^3$; the content of the barite is adjusted to 105 pbw, so that a water-based drilling fluid Y3-2 is prepared, and the density of the drilling fluid is 1.8 g/cm$^3$.

Drilling Fluid Examples 4-5

The formulation for Y1-1 described in the drilling fluid example 1 is used, but the difference is that the bridging agent A1 is replaced by bridging agents A4 and A5 respectively; thus, water-based drilling fluids Y4-1 and Y5-1 are prepared, and the density of the drilling fluids is 1.4 g/cm$^3$; the content of the barite is adjusted to 105 pbw, so that water-based drilling fluids Y4-2 and Y5-2 are prepared, and the density of the drilling fluids is 1.8 g/cm$^3$.

Drilling Fluid Comparative Examples 1-4

The formulation for Y1-1 described in the drilling fluid example 1 is used, but the difference is that the bridging agent A1 is replaced by the bridging agents DA1-DA4 respectively; thus, water-based drilling fluids DY1-DY4 are prepared, and the density of the drilling fluids is 1.8 g/cm$^3$.

35

Drilling Fluid Comparative Example 5

The formulation for Y1-1 described in the drilling fluid example 1 is used, but the difference is that the bridging agent A1 is not used; thus, a water-based drilling fluid DY5 is prepared, and the density of the drilling fluid is 1.8 g/cm³.

Drilling Fluid Comparative Example 6

The formulation for Y1-1 described in the drilling fluid example 1 is used, but the difference is that the nano-plugging agent S1 is not used; thus, a water-based drilling fluid DY6 is prepared, and the density of the drilling fluid is 1.8 g/cm³.

Drilling Fluid Comparative Example 7

The formulation for Y1-1 described in the drilling fluid example 1 is used, but the difference is that the nano-plugging agent S1, rheological modifier B1, bionic wall bracing agent GBFS-1, bionic shale inhibitor YZFS-1, and bridging agent A1 are not used, and the amount of the barite is adjusted so that the density of the drilling fluid is 1.8 g/cm³; thus, a water-based drilling fluid DY7 is obtained.

Test Case 1

The rheological property and filter loss property of the above drilling fluids are measured. Specifically, the apparent viscosity (AV), plastic viscosity (PV), yield point (YP), ratio of initial gel strength to final gel strength (G10″/10′), API filter loss, and HTHP filter loss of the drilling fluids are measured before the drilling fluids are aged and after the drilling fluids are aged for 16 h at 150° C. respectively; the results are shown in Table 1, wherein:

The apparent viscosity (AV) is measured with a FANN six-speed viscosity meter with the method specified in the national standard GB/T29170-2012, in unit of mPa·s, $AV=\frac{1}{2}\theta_{600}$.

The plastic viscosity (PV) is measured with a FANN six-speed viscosity meter with the method specified in the national standard GB/T29170-2012, in unit of mPa·s, $PV=\theta_{600}-\theta_{300}$.

The yield point (YP) is measured with a FANN six-speed viscosity meter with the method specified in the national standard GB/T29170-2012, $YP=0.511$ $(2\times\varphi300-\varphi600)$ in unit of Pa.

The ratio of initial gel strength to final gel strength (G10″/10′) is measured with a FANN six-speed viscosity meter with the method specified in the national standard GB/T29170-2012, in unit of Pa/Pa.

API refers to intermediate pressure filter loss, and is measured with an API filter loss meter with the method specified in the standard SY/T5621-93, in unit of mL.

HTHP refers to high-temperature and high-pressure filter loss, and is measured with a HTHP filter loss meter with the method specified in the national standard GB/T29170-2012, in unit of mL.

TABLE 1

| Drilling Fluid | AV (mPa·s) | PV (mPa·s) | YP (Pa) | G10″/10′ (Pa/Pa) | API (mL) | HTHP (mL) |
|---|---|---|---|---|---|---|
| Before aging | | | | | | |
| Y1-1 | 36 | 30 | 6 | 3/6 | 1.2 | / |
| Y1-2 | 40 | 32 | 8 | 3.5/5.5 | 1 | / |
| Y2-1 | 38 | 31 | 7 | 2.5/6 | 1.4 | / |
| Y2-2 | 41 | 33 | 8 | 3/6 | 1.2 | / |

TABLE 1-continued

| Drilling Fluid | AV (mPa·s) | PV (mPa·s) | YP (Pa) | G10″/10′ (Pa/Pa) | API (mL) | HTHP (mL) |
|---|---|---|---|---|---|---|
| Y3-1 | 37 | 29 | 8 | 2/3.5 | 1.4 | / |
| Y3-2 | 42 | 33 | 9 | 2/4 | 1 | / |
| Y4-1 | 38.5 | 30 | 8.5 | 3/5 | 1.8 | / |
| Y4-2 | 43 | 33 | 10 | 2/5.5 | 1.6 | / |
| Y5-1 | 39 | 31 | 8 | 3/4.5 | 2 | / |
| Y5-2 | 43.5 | 36 | 7.5 | 2/5 | 1.4 | / |
| DY1 | 43 | 34 | 9 | 1.5/4.5 | 2.2 | / |
| DY2 | 44 | 35 | 9 | 3/5 | 2.4 | / |
| DY3 | 43 | 35 | 8 | 2.5/6 | 2.6 | / |
| DY4 | 45 | 35 | 10 | 3/6 | 2.8 | / |
| DY5 | 33.5 | 27 | 6.5 | 1/2.5 | 3.2 | / |
| DY6 | 32.5 | 26 | 6.5 | 1.5/3 | 3.4 | / |
| DY7 | 18 | 11 | 7 | 0.5/1.5 | 12 | / |
| After aging at 150° C. for 16 h | | | | | | |
| Y1-1 | 35 | 28 | 7 | 2/6 | 1.4 | 5.4 |
| Y1-2 | 39 | 30 | 9 | 2.5/6.5 | 1.2 | 5.2 |
| Y2-1 | 37 | 29 | 8 | 2/5 | 1.6 | 5.6 |
| Y2-2 | 40 | 31 | 9 | 2.5/7 | 1.4 | 5.4 |
| Y3-1 | 36 | 27 | 9 | 2/4 | 1.6 | 5.6 |
| Y3-2 | 41 | 31 | 10 | 2.5/5 | 1.2 | 5.2 |
| Y4-1 | 37 | 28 | 9 | 2.5/6 | 2 | 8 |
| Y4-2 | 41.5 | 31 | 10.5 | 2/6 | 1.8 | 7.8 |
| Y5-1 | 37.5 | 29 | 8.5 | 2.5/5.5 | 2.2 | 8.2 |
| Y5-2 | 42 | 34 | 8 | 3/6 | 1.6 | 7.6 |
| DY1 | 41 | 32 | 9 | 1.5/4 | 2.6 | 8.4 |
| DY2 | 42 | 33 | 9 | 2.5/5 | 2.8 | 8.6 |
| DY3 | 41 | 33 | 8 | 2/5 | 3 | 8.8 |
| DY4 | 43 | 33 | 10 | 2/5.5 | 3.2 | 9 |
| DY5 | 31.5 | 25 | 6.5 | 1/2 | 3.6 | 10.2 |
| DY6 | 30.5 | 24 | 6.5 | 1/2.5 | 3.8 | 10.4 |
| DY7 | 16 | 9 | 7 | 0.5/1 | 16 | 40 |

It is seen from the data in Table 1: the drilling fluid examples have good rheological property, and both the API filter loss and the HTHP filter loss are low, which indicate that the system has good plugging performance. After the plugging agent, nano-plugging agent, bionic wall bracing agent and bionic inhibitor in the drilling fluid system are replaced, the API filter loss and HTHP filter loss increase, and the plugging performance of the system is degraded.

Test Case 2

The plugging performance of the above drilling fluids is measured respectively, i.e., for each of the above drilling fluids, 400 mL drilling fluid is taken and aged at 150° C. for 16 h, and the plugging performance of the drilling fluid is measured with a sand bed HTHP filter loss tester. The measurement results are shown in Table 2.

Measurement method with the sand bed HTHP filter loss tester: 200 g quartz sand of a specific mesh number (see Table 2 for the mesh numbers) is filled into the base layer of the filter loss tester, and then the drilling fluid is loaded into the filter loss tester to the scale mark; a pressure booster is mounted into the upper end of a communicating valve stem, a back pressure device is mounted into the lower end of the communicating valve stem, positioning pins are inserted into the two ends for positioning, and an air source is connected; the handle of the pressure booster and the handle of the back pressure device are adjusted, so that the indicated pressure is 0.7 MPa; the top valve is opened to maintain 0.7 MPa pressure, the temperature is maintained at a specified temperature (the test temperature is 120° C. for a 20-40 mesh sand bed and 150° C. for a 40-70 mesh sand bed), and then the pressure booster is adjusted to 4.2 MPa quickly, and the bottom valve is opened, and timing is started; after the bottom valve is opened and timing is started, the pressure is increased once every 10 min, and the corresponding filter loss is logged.

TABLE 2

| Drilling Fluid | Test Pressure | | | | | | |
|---|---|---|---|---|---|---|---|
| | 0.7 MPa | 1.5 MPa | 5.5 MPa | 7.5 MPa | 10.5 MPa | 13.5 MPa | 15 MPa |
| Filter loss through 20-40 mesh sand bed under different pressure difference conditions (mL) | | | | | | | |
| Y1-1 | 0 | 0 | 0 | 0 | 0 | 0 | 0 |
| Y1-2 | 0 | 0 | 0 | 0 | 0 | 0 | 0 |
| Y2-1 | 0 | 0 | 0 | 0 | 0 | 0 | 0 |
| Y2-2 | 0 | 0 | 0 | 0 | 0 | 0 | 0 |
| Y3-1 | 0 | 0 | 0 | 0 | 0 | 0 | 0 |
| Y3-2 | 0 | 0 | 0 | 0 | 0 | 0 | 0 |
| Y4-1 | 0.8 | 0.8 | 1.2 | 0 | 0 | 0 | 0 |
| Y4-2 | 0.6 | 1 | 1.4 | 0 | 0 | 0 | 0 |
| Y5-1 | 0.8 | 0.8 | 1.2 | 0 | 0 | 0 | 0 |
| Y5-2 | 1 | 1 | 1.6 | 0 | 0 | 0 | 0 |
| DY1 | 2 | 2 | 2.4 | 3 | 0 | 0 | 0 |
| DY2 | 1.8 | 1.8 | 2.6 | 3.4 | 0 | 0 | 0 |
| DY3 | 2 | 2.2 | 2.8 | 3.6 | 4 | 0 | 0 |
| DY4 | 1.8 | 2.6 | 2.6 | 4.2 | 4.4 | 0 | 0 |
| DY5 | 2 | 2.8 | 3.4 | 4.6 | 5 | 0 | 0 |
| DY6 | 2.2 | 2.4 | 3.6 | 5 | 5.4 | 0 | 0 |
| DY7 | 20 | 40 | 180 | 400 | 400 | 400 | 400 |
| Filter loss through 40-70 mesh sand bed under different pressure difference conditions (mL) | | | | | | | |
| Y1-1 | 0 | 0 | 0 | 0 | 0 | 0 | 0 |
| Y1-2 | 0 | 0 | 0 | 0 | 0 | 0 | 0 |
| Y2-1 | 0 | 0 | 0 | 0 | 0 | 0 | 0 |
| Y2-2 | 0 | 0 | 0 | 0 | 0 | 0 | 0 |
| Y3-1 | 0 | 0 | 0 | 0 | 0 | 0 | 0 |
| Y3-2 | 0 | 0 | 0 | 0 | 0 | 0 | 0 |
| Y4-1 | 0.4 | 0.4 | 0.8 | 0 | 0 | 0 | 0 |
| Y4-2 | 0.2 | 0.6 | 1 | 0 | 0 | 0 | 0 |
| Y5-1 | 0.4 | 0.4 | 0.8 | 0 | 0 | 0 | 0 |
| Y5-2 | 0.6 | 0.6 | 1.2 | 0 | 0 | 0 | 0 |
| DY1 | 1.6 | 1.6 | 2 | 0 | 0 | 0 | 0 |
| DY2 | 1.4 | 1.4 | 2.2 | 0 | 0 | 0 | 0 |
| DY3 | 1.6 | 1.8 | 2.4 | 0 | 0 | 0 | 0 |
| DY4 | 1.4 | 2.2 | 2.2 | 0 | 0 | 0 | 0 |
| DY5 | 1.6 | 2.4 | 3 | 0 | 0 | 0 | 0 |
| DY6 | 1.8 | 2 | 3.2 | 0 | 0 | 0 | 0 |
| DY7 | 16 | 24 | 60 | 100 | 120 | 128 | 130 |

It is seen from the data in Table 2: the drilling fluid examples have good plugging performance. After the plugging agent, nano-plugging agent, bionic wall bracing agent, and bionic inhibitor in the drilling fluid system are replaced, the plugging performance of the system is degraded.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention.

In addition, it should be noted that the specific technical features described in above embodiments can be combined in any appropriate form, provided that there is no conflict. To avoid unnecessary repetition, the possible combinations are not described specifically in the present invention. Moreover, different embodiments of the present invention can be combined freely as required, as long as the combinations don't deviate from the ideal and spirit of the present invention. However, such combinations shall also be deemed as falling into the scope disclosed in the present invention.

The invention claimed is:

1. A drilling fluid additive composition, containing a bridging agent, a nano-plugging agent, a rheological modifier, a bionic wall bracing agent, and a bionic shale inhibitor, wherein, the bridging agent is a weak-crosslinked copolymer that contains structural units represented by formula (1), structural units represented by formula (2), and structural units represented by formula (3), and content of cross-linker structures in the weak-crosslinked copolymer is 0.1-1 wt. %;

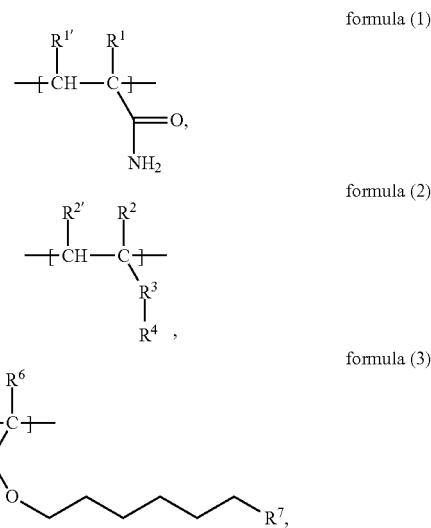

where, $R^1$, $R^{1'}$, $R^2$, $R^{2'}$, $R^6$ and $R^{6'}$ are independently selected from H and C1-C6 alkyl; $R^3$ is selected from C0-C6 alkylene; $R^4$ is selected from —COOM, —SO$_3$M and —CO—NH—$R^5$—SO$_3$M, $R^5$ is selected from C0-C6 alkylene, M is selected from H or alkali metal; $R^7$ is selected from H or C1-C20 alkyl; the cross-linker structures in the weak-crosslinked copolymer are represented by formula (4):

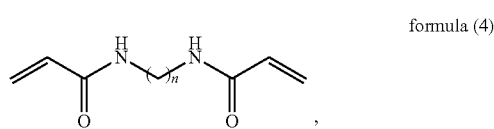

n is 1-6;

the nano-plugging agent is modified silicon dioxide nano-particles, the modifying group on the modified silicon dioxide nano-particles includes an acrylic copolymer chain, and structural units in the acrylic copolymer chain are provided by one or more of monomers represented by the following formula (A) and one or more of monomers represented by the following formula (B); the molar ratio of the structural units provided by the monomers represented by formula (A) to the structural units provided by the monomers represented by formula (B) is 1:0.5-5; the weight-average molecular weight of the acrylic copolymer chain is 100,000-1,500,000 g/mol:

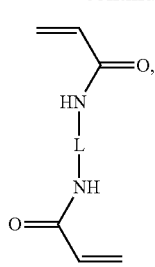

formula (B)

wherein $L^1$ is selected from —OH, C1-C10 alkoxy, and —N(L$^3$)L$^2$, L$^2$ and L$^3$ are independently selected from H, C1-C10 alkyl, and C1-C10 alkyl substituted by a substituent, and the substituent is one or more of —COOH, —OH, halogen, and —SO$_3$H; L is C0-C10 alkylene;

the rheological modifier is a dimer acid-organic amine copolymer comprising structural units from a dimer acid, structural units from an alkylamine and structural units from an arylamine, of which the dimer acid is a dimer of oleic acid and linoleic acid, the alkylamine is one or more of C10-C20 alkyl primary amines, and the arylamine is one or more of aniline and aniline substituted by C1-C3 alkyl at one or more sites on benzene ring;

the bionic wall bracing agent is carboxymethyl chitosan with a dopamine-derived group represented by the following formula (I-1) grafted on its main chain:

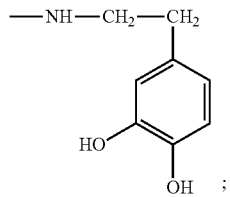

formula (I-1)

the bionic shale inhibitor is composed of structural units represented by the following formula (III-1) and structural units represented by the following formula (IV-1):

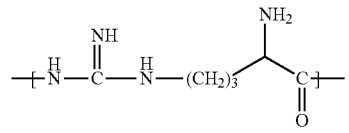

formula (III-1)

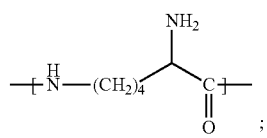

formula (IV-1)

the molar ratio of the structural units represented by formula (III-1) to the structural units represented by formula (IV-1) is 0.2-6:1, and the weight-average molecular weight of the bionic shale inhibitor is 800-4,000 g/mol.

2. The composition according to claim 1, wherein a weight ratio of the bridging agent to the nano-plugging agent to the rheological modifier to the bionic wall bracing agent to the bionic shale inhibitor is 100:40-200:5-80:20-200:10-80.

3. The composition according to claim 1, wherein a weight ratio of the bridging agent to the nano-plugging agent to the rheological modifier to the bionic wall bracing agent to the bionic shale inhibitor is 100:50-150:10-60:30-120:20-70.

4. The composition according to claim 1, wherein in the weak-crosslinked copolymer, $R^1$, $R^{1'}$, $R^2$, $R^{2'}$, $R^6$ and $R^{6'}$ are independently selected from H and C1-C4 alkyl; $R^3$ is selected from C0-C4 alkylene; $R^4$ is selected from —COOM, —SO$_3$M or —CO—NH—R$^5$—SO$_3$M, $R^5$ is selected from C1-C6 alkylene, M is selected from H, Na or K; $R^7$ is selected from C2-C16 alkyl.

5. The composition according to claim 4, wherein in the weak-crosslinked copolymer, $R^1$, $R^{1'}$, $R^2$, $R^{2'}$, $R^6$ and $R^{6'}$ are independently selected from H, methyl, ethyl and n-propyl; $R^3$ is selected from C0 alkylene, —CH$_2$—, —CH$_2$—CH$_2$—, —CH$_2$—CH$_2$—CH$_2$—, —CH(CH$_3$)—CH$_2$—, —CH$_2$—CH(CH$_3$)— or —CH$_2$—(CH$_2$)$_2$—CH$_2$—; $R^4$ is selected from —COOH, —SO$_3$M or —CO—NH—R$^5$—SO$_3$M, $R^5$ is selected from —CH$_2$—, —CH$_2$—CH$_2$—, —CH$_2$—CH$_2$—CH$_2$—, —CH(CH$_3$)—CH$_2$—, —CH$_2$—CH(CH$_3$)—, —CH$_2$—(CH$_2$)$_2$—CH$_2$—, —CH$_2$—CH(CH$_3$)—CH$_2$—, —C(CH$_3$)$_2$—CH$_2$— or —CH$_2$—C(CH$_3$)$_2$—, M is selected from H, Na or K; $R^7$ is selected from ethyl, n-propyl, n-butyl, n-pentyl, n-hexyl, n-heptyl, n-octyl, n-nonyl, n-decyl, n-hendecyl, n-dodecyl, n-tridecyl, n-tetradecyl, n-pentadecyl or n-hexadecyl.

6. The composition according to claim 1, wherein in the weak-crosslinked copolymer, the molar ratio of the structural units represented by formula (1) to the structural units represented by formula (2) to the structural units represented by formula (3) is 10-50:3-20:1.

7. The composition according to claim 6, wherein in the weak-crosslinked copolymer, the molar ratio of the structural units represented by formula (1) to the structural units represented by formula (2) to the structural units represented by formula (3) is 12-40:5-15:1.

8. The composition according to claim 1, wherein the weight-average molecular weight of the weak-crosslinked copolymer is $3\times10^6$-$10\times10^6$ g/mol.

9. The composition according to claim 8, wherein the weight-average molecular weight of the weak-crosslinked copolymer is $3.5\times10^6$-$7\times10^6$ g/mol;

the content of cross-linker structures in the weak-crosslinked copolymer is 0.3-0.6 wt. %.

10. The composition according to claim 1, wherein in the modified silicon dioxide nano-particle, the structural units in the acrylic copolymer chain is composed of one or more of structural units represented by the following formula (A-a) and one or more of structural units represented by the following formula (B-a):

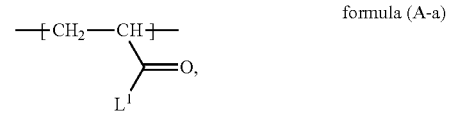

formula (A-a)

-continued

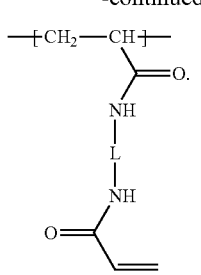

formula (B-a)

11. The composition according to claim 1, wherein in the modified silicon dioxide nano-particle, $L^1$ is selected from —OH, C1-C6 alkoxy, or —N($L^3$)$L^2$, $L^2$ and $L^3$ are independently selected from H, C1-C6 alkyl, and C1-C6 alkyl substituted by a substituent, and the substituent is one or more of —COOH, —OH, and —SO$_3$H; L is C1-C6 alkylene.

12. The composition according to claim 11, wherein in the modified silicon dioxide nano-particle, $L^1$ is selected from —OH, C1-C4 alkoxy, and —N($L^3$)$L^2$, $L^2$ and $L^3$ are independently selected from H, C1-C4 alkyl, and C1-C4 alkyl substituted by a substituent, and the substituent is one or more of —COOH, —OH, and —SO$_3$H; L is C1-C4 alkylene.

13. The composition according to claim 12, wherein in the modified silicon dioxide nano-particle, $L^1$ is selected from —OH, methoxy, ethoxy, propoxy, or —N($L^3$)$L^2$, $L^2$ and $L^3$ are independently selected from H, methyl, ethyl, propyl, isopropyl, isobutyl, tert-butyl, methyl substituted by a substituent, ethyl substituted by a substituent, propyl substituted by a substituent, isopropyl substituted by a substituent, isobutyl substituted by a substituent, and tert-butyl substituted by a substituent, and the substituent in the substituted C1-C4 alkyl is —COOH and/or —SO$_3$H; L is —CH$_2$—, —CH$_2$—CH$_2$—, —CH$_2$—CH$_2$—CH$_2$—, —CH(CH$_3$)—CH$_2$—, —C(CH$_3$)$_2$—CH$_2$—, —CH$_2$—C(CH$_3$)$_2$— or —CH$_2$—CHCH$_3$—CH$_2$—.

14. The composition according to claim 11, wherein in the acrylic copolymer chain, a molar ratio of the structural units provided by the monomers represented by formula (A) to the structural units provided by the monomers represented by formula (B) is 1:1-2;
the weight-average molecular weight of the acrylic copolymer chain is 120,000-1,400,000 g/mol.

15. The composition according to claim 1, wherein based on the total weight of the modified silicon dioxide nano-particle, the content of the acrylic copolymer chain is ≥60 wt. %;
the particle diameter of the modified silicon dioxide nano-particle is 3-30 nm.

16. The composition according to claim 1, wherein the bionic wall bracing agent contains structural units represented by the following formula (I):

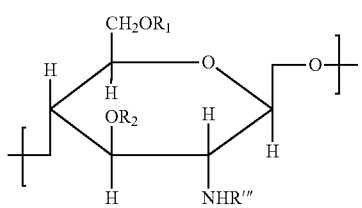

formula (I)

wherein $R^1$ is selected from H,

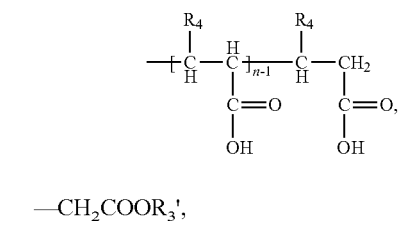

—CH$_2$COOR$_3$',

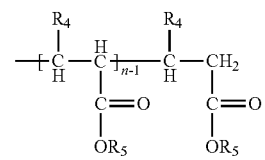

and —CH$_2$COOR$_3$, $R^2$ is selected from H,

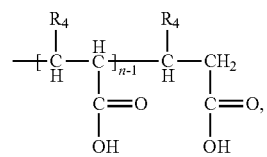

and

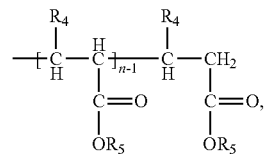

and at least one of $R_1$ and $R_2$ is

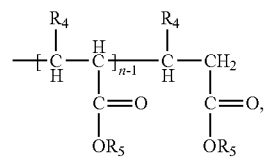

n is equal to or greater than 1, each of the n $R_5$ groups is H or the dopamine-derived group respectively and independently, and at least one of the n $R_5$ groups is the dopamine-derived group, $R_4$ is H or $C_1$-$C_{10}$ alkyl, R''' is selected from H, —CH$_2$COOR$_3$' and —CH$_2$COOR$_3$, and $R_1$ and R''' are not H at the same time, $R_3$' is H or alkali metal, and $R_3$ is the dopamine-derived group.

17. The composition according to claim 1, wherein in the rheological modifier, the alkylamine is one or more of dodecyl primary amine, tridecyl primary amine, tetradecyl primary amine, pentadecyl primary amine, hexadecyl primary amine, heptadecyl primary amine, and octodecyl primary amine;
the arylamine is one or more of aniline, 2-methylaniline, 3-methylaniline, 4-methylaniline, 2-ethylaniline, 3-ethylaniline, 4-ethylaniline, 2-propylaniline, 3-propylaniline, and 4-propylaniline.

18. The composition according to claim 1, wherein in the rheological modifier, a molar ratio of the structural units from dimer acid to the structural units from alkylamine to the structural units from arylamine is 1:0.3-1:0.2-1;
   a weight-average molecular weight of the dimer acid-organic amine copolymer is 2,200-9,000 g/mol, and the absolute viscosity of the dimer acid-organic amine copolymer is 20,000-150,000 cp.

19. A water-based drilling fluid containing the composition according to claim 1.

20. The water-based drilling fluid according to claim 19, wherein based on 100 pbw water in the water-based drilling fluid, the content of the composition is 10-20 pbw.

* * * * *